United States Patent [19]

Barski

[11] Patent Number: 5,054,094

[45] Date of Patent: Oct. 1, 1991

[54] ROTATIONALLY IMPERVIOUS FEATURE EXTRACTION FOR OPTICAL CHARACTER RECOGNITION

[75] Inventor: Lori L. Barski, Pittsford, N.Y.

[73] Assignee: Eastman Kodak Company, Rochester, N.Y.

[21] Appl. No.: 520,336

[22] Filed: May 7, 1990

[51] Int. Cl.⁵ .............................................. G06K 9/46
[52] U.S. Cl. ...................................... 382/18; 382/23; 382/68; 382/25
[58] Field of Search ........................ 382/18, 23, 68, 25

[56] References Cited

U.S. PATENT DOCUMENTS

| | | | |
|---|---|---|---|
| 2,838,602 | 6/1958 | Sprick | 382/18 |
| 3,050,711 | 8/1962 | Harmon | 382/68 |
| 3,407,386 | 9/1968 | Spanjersberg | 340/146.3 |
| 3,506,837 | 4/1970 | Majima | 382/68 |
| 3,715,724 | 2/1973 | Demonte et al. | 340/146.3 |
| 3,766,520 | 10/1973 | Patterson | 340/146.3 |
| 3,805,239 | 4/1974 | Watanabe | 340/146.3 |
| 3,909,785 | 9/1975 | Howells | 340/146.3 |
| 3,968,475 | 7/1976 | McMahon | 340/146.3 |
| 4,000,399 | 12/1976 | Kawahara | 235/92 |
| 4,048,615 | 8/1977 | Chuang et al. | 340/146.3 |
| 4,109,237 | 8/1978 | Hill | 382/23 |
| 4,132,976 | 1/1979 | Siegal | 340/146.3 |
| 4,163,214 | 7/1979 | Komori et al. | 340/146.3 |
| 4,185,270 | 1/1980 | Fischer et al. | 340/146.3 |
| 4,208,652 | 6/1980 | Marshall | 340/146.3 |
| 4,242,734 | 12/1980 | Deal | 364/515 |
| 4,275,381 | 6/1981 | Siegal | 340/146.3 |
| 4,361,830 | 11/1982 | Honma et al. | 340/146.3 |
| 4,607,384 | 8/1986 | Brooks | 382/18 |
| 4,628,533 | 9/1986 | Hongo et al. | 382/27 |
| 4,641,355 | 2/1987 | Hongo et al. | 382/34 |
| 4,644,583 | 2/1987 | Watanabe et al. | 382/22 |
| 4,651,341 | 3/1987 | Nakashima et al. | 382/34 |
| 4,672,678 | 6/1987 | Koezuka et al. | 382/30 |
| 4,704,694 | 11/1987 | Czerniejewski | 364/513 |
| 4,712,248 | 12/1987 | Hongo | 382/22 |
| 4,742,556 | 5/1988 | Davis, Jr. et al. | 382/51 |
| 4,754,493 | 6/1988 | Coates | 382/48 |
| 4,783,829 | 11/1988 | Miyakawa et al. | 382/22 |
| 4,783,830 | 11/1988 | Johnson et al. | 382/34 |
| 4,817,187 | 3/1989 | Lien | 382/156 |
| 4,922,543 | 5/1990 | Ahlbom et al. | 382/18 |

FOREIGN PATENT DOCUMENTS

226379 8/1985 Fed. Rep. of Germany.
56-47876 4/1981 Japan.
57-113183 7/1982 Japan.

OTHER PUBLICATIONS

Buchowski et al., "Omnirec: A Character Recognition System", *Technical Report AI* TR88-67, The University of Texas, Austin, Tex. (Feb. 1988), pp. 32–39.

Primary Examiner—David K. Moore
Assistant Examiner—David Fox
Attorney, Agent, or Firm—Dennis R. Arndt

[57] ABSTRACT

A feature-based optical character recognition system, employing a feature-based recognition device such as a neural network or an absolute distance measure device, extracts a set of features from segmented character images in a document, at least some of the extracted features being at least nearly impervious to rotation or skew of the document image, so as to enhance the reliability of the system. One rotationally invariant feature extracted by the system is the number of intercepts between boundary transitions in the image with at least a selected one of a plurality of radii centered at the centroid of the character in the image.

24 Claims, 11 Drawing Sheets

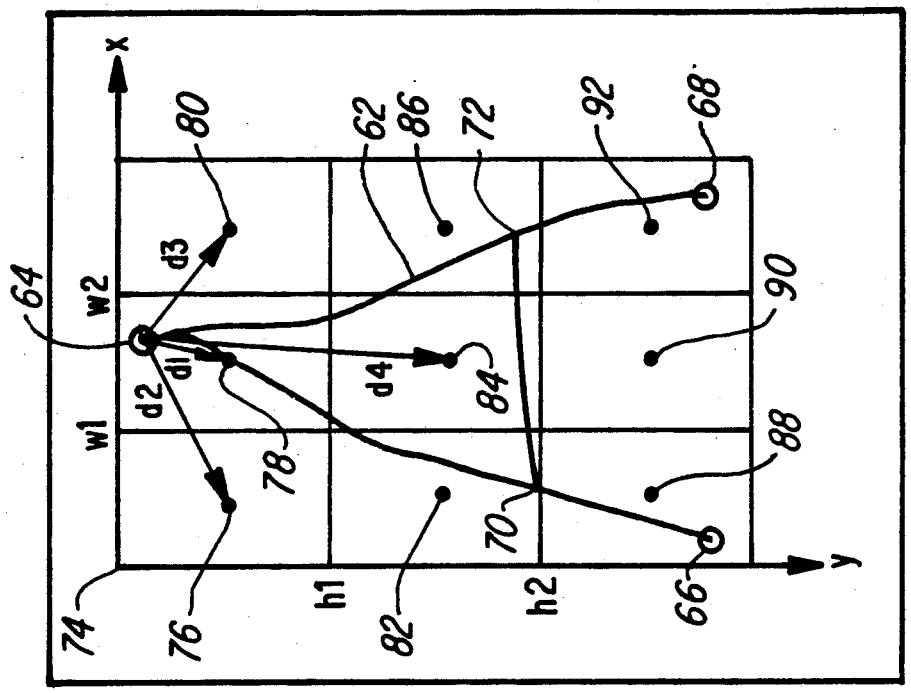
FIG.7B
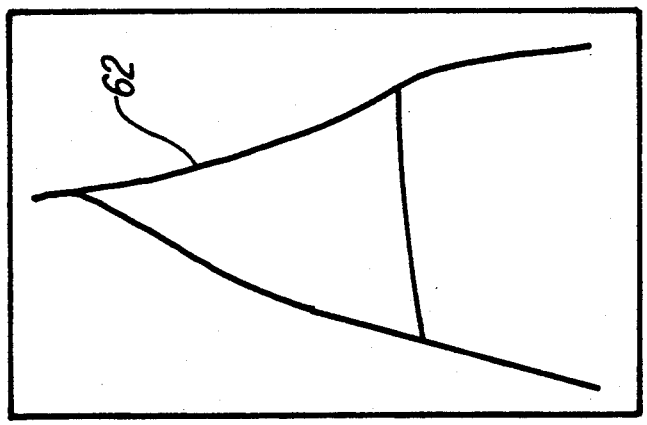
FIG.7A
FIG.7C

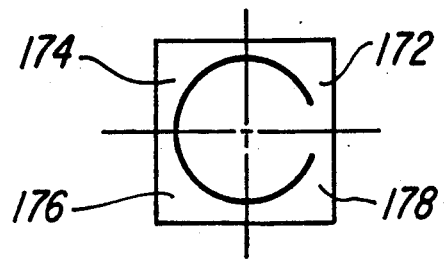
FIG.15
0 0 1 1 0 0 0 0 0 1 0 0 0 1 0 0   : RADIAL INTERCEPTS
             ↖︎170
FIG.16
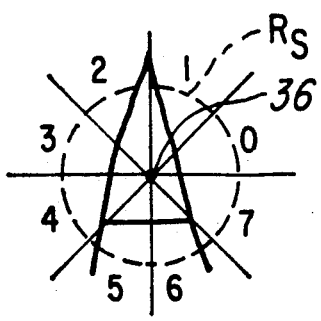
FIG.17

ROTATIONALLY IMPERVIOUS FEATURE EXTRACTION FOR OPTICAL CHARACTER RECOGNITION

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention is related to techniques in optical character recognition for extracting features from the image of each character in a document, which features are used in a feature-based recognition device to recognize each character.

BACKGROUND ART

Feature-based optical character recognition systems search for predetermined geometric features in the bit-map image of each unknown character in a document to be read. Such systems recognize each character based upon a knowledge of the presence or absence of various ones of the features in each one of a complete set of known symbols. One exemplary feature-based recognition technique is the absolute distance measure, in which the extraction of features from each unknown character bit-map creates an N-dimensional vector, whose absolute distance from each one of a set of N-dimensional vectors representing the symbol set determines the identity of the unknown character. Another example of feature-based recognition techniques is a neural network trained to identify the character image based upon its bit-map image. In this case, the feature used to identify the character can be the character bit-map itself.

One problem with such feature-based recognition systems is that the character bit-map or the geometric features found in the bit-map are significantly altered by rotation of the image. Such rotation can arise from document skew, for example. Alteration of the features can degrade performance of the optical character recognition system, giving rise to erroneous identification or making it difficult to identify given characters in the document.

Several techniques are known for extracting contour features of an image. German Patent Document No. DD-226,379-A suggests the idea of scanning an image along a spiral. Japanese Patent Document No. 57-113,183 (A) discloses classifying an unknown character by a set of lengths from the character's centroid to various sides of a polygon circumscribing the character. U.S. Pat. No. 4,742,556 (Davis, Jr., et al.) discloses a character recognition method in which a histogram of various gray levels of the image is made in each one of a set of blocks into which the image has been divided. Japanese Patent Document No. 56-47876 (A) describes a method for extracting the contour features of a character. U.S. Pat. No. 4,361,830 (Honma et al.) describes a method for extracting contour features of an image by measuring the distances between extremities in the contour and a locally averaged contour of the image. U.S. Pat. No. 4,704,694 (Czerniejewski) discloses a method of learning contours of known objects and comparing them to the contours of unknown objects to orient them for grasping by a robot. U.S. Pat. No. 4,000,399 (Kawahara) discloses a pattern counting system which automatically fills in holes in unknown patterns to simplify the process. U.S. Pat. No. 4,712,248 (Hongo) discloses using a list of segments of the object between corners in its outer contour as a feature for object identification. U.S. Pat. No. 4,208,652 (Marshall) discloses using a pattern consisting of the number of like-valued pixels in each local neighborhood of the image as a feature for identifying unknown images. U.S. Pat. No. 4,163,214 (Komori et al.) discloses a method similar to that of U.S. Pat. No. 4,208,652 (Marshall) discussed above.

Several techniques are known for detecting arcs in an image using templates. U.S. Pat. No. 3,766,520 (Patterson) discloses classifying an unknown character by its correlation with each one of four quadrant arcs of a circle. U.S. Pat. No. 3,407,386 (Spanjersberg) discloses a character reading system which characterizes an unknown image in accordance with the presence or absence of a loop in each one of four quadrants into which the image is divided. U.S. Pat. No. 3,968,475 (McMahon) discloses feature extraction by convolving a binary image with a complete set of templates consisting of squares divided into square quadrants, each quadrant being entirely either black or white, in all possible combinations thereof. U.S. Pat. No. 3,715,724 (Demonte et al.) is similar to McMahon and discloses feature extraction by convolving an unknown image with a set of templates representing various basic geometric patterns, each template consisting of a square divided into small sub-squares, the pattern of black sub-squares in each template representing one of the geometric patterns. U.S. Pat. No. 4,644,583 (Watanabe et al.) discloses a method of identifying circular lines in the contour of an unknown object. U.S. Pat. No. 4,672,678 (Koezuka et al.) discloses a system for identifying characters by matching an unknown character with the image or template of one of a set of known characters, rather than using feature extraction. U.S. Pat. Nos. 4,641,355 and 4,628,533 (both by Hongo et al.) disclose an improvement to systems like that of Koezuka et al., the improvement being that pixels whole values are ambivalent with respect to identifying a particular character and pixels which are known to be associated with noise frequently accompanying a particular character are masked in the unknown image before the matching process is performed. U.S. Pat. No. 4,783,829 (Miyakawa et al.) is a pattern recognition system which approximates the unknown image with a circumscribing polygon and matches the polygon with a set of stored patterns. U.S. Pat. No. 4,651,341 (Nakashima et al.) discloses a pattern recognition system for printed circuit board inspection. U.S. Pat. No. 4,754,493 (Coates) discloses a pattern recognition system useful in terrain-following radar for guidance systems.

Several techniques are known for detecting endpoints or branch points in an image. U.S. Pat. No. 4,242,734 (Deal) discloses a method for detecting corners in an image by convolving the image with two-dimensional Haar transform coefficients. Japanese Patent Document No. 59-23,081 (A) discloses a method for detecting and extracting endpoints in an image for printed circuit board inspection. U.S. Pat. No. 3,909,785 (Howells) discloses a character recognition system for hand-printed characters which extracts each character stroke in a plurality of sectors into which the image is divided. U.S. Pat. No. 3,805,239 (Watanabe) discloses a pattern recognition apparatus for use with a gray level image which extracts features from an unknown object by detecting the gray level of a group of pixels in a 3×3 movable window. U.S. Pat. No. 4,783,830 (Johnson et al.) discloses using a pattern-matching content addressable memory for computing distances in N-space between a vector of N pixels of an unknown object and a set of N-dimensional reference vectors of known objects. Japanese Patent Document No. 60-142,480 (A) discloses a character segmentation system for use in a character reader. U.S. Pat. No. 4,132,976 (Siegal) and U.S. Pat. No. 4,275,381 (Siegal) each disclose a method for forming characters which are both optically and electronically readable. U.S. Pat. No. 4,185,270 (Fischer et al.) discloses a fingerprint identification system, which detects the strokes in the image of an unknown fingerprint and matches their attributes (e.g., endpoint locations) with the attributes of a large set of known fingerprints.

Several techniques are known for detecting straight and diagonal lines in an image. U.S. Pat. No. 3,766,520 (Patterson) suggests classifying the image of an unknown character in accordance with its correlation with a horizontal line image, a vertical line image, a major diagonal line image and a minor diagonal line image. U.S. Pat. No. 4,817,187 (Lien) makes the same suggestion as Patterson discussed above. U.S. Pat. No. 4,048,615 (Chuang et al.) discloses a character recognition system which detects horizontal and vertical line segments resident in rows or columns, respectively, of pixels in the image of an unknown character.

None of the foregoing techniques appears to address itself to the problem of feature extraction in a rotated image. In fact, the features extracted by the foregoing techniques appear to undergo significant changes under rotation of the document image. In order to assure adequate reliability, there is a need for a feature extraction process and system which is virtually invariant or at least resists significant alteration under rotation of the document image.

DISCLOSURE OF THE INVENTION

The invention is a feature-based optical character recognition system and process which extracts from the character image bit-map a set of features, the key ones of which are nearly invariant under rotation of the image. The set of features employed is comprehensive enough to ensure unambiguous identification of each document character. The presence in the feature set of key features which are nearly invariant under image rotation within a certain range reduces the probability that such rotation can disrupt character identification by the feature-based optical character recognition system.

The system of the invention extracts a first rotationally invariant feature from the character bit-map image by identifying radial intercepts of black-to-white transitions in an object in the bit-map image encountered along the edge of each one of a series of concentric circles of successively larger predetermined radii centered at the centroid of the object, or at least one circle thereof. The population at each radius of such transitions is a rotationally invariant feature characterizing the character bit-map image.

The system of the invention extracts a second feature which is rotationally invariant within a limited range of rotation angle. In extracting this second feature, the system determines for each end point and branch point in the bit-map image which pair of squares in a grid of squares superimposed on the bit-map image have their centers closest to the endpoint or branch point. The feature thus extracted is a listing of the corresponding pairs or squares in the grid for branch points and another lifting for end points. Preferably, the squares in the grid are sufficiently large to reduce the probability of an image rotation over a limited rotation angle changing the determination of nearest pairs of square centers.

In addition to the foregoing key features, other features not necessarily as invariant under rotation are extracted from the bit-map image so that all extracted features together are sufficiently comprehensive to provide unambiguous feature-based character recognition in nearly all cases. These other features include the presence of each one of four quadrant arcs of a circle and their location by quadrant in the bit-map image and the correlation of the image with horizontal lines, vertical lines, major diagonal lines and minor diagonal lines.

In a preferred embodiment of the invention, the foregoing features are transmitted along with the bit-map image as a single N-dimensional vector to an absolute distance measure feature-based recognition device. The device stores a set of N-dimensional reference vectors extracted from a complete set of known symbols. The reference vectors are formed from images of a set of known symbols by the same process used to generate the single N-dimensional vector representing the bit-map image of the unknown character. Finding the reference vector having the smallest absolute distance from the unknown vector identities the correct symbol.

In another preferred embodiment of the invention, a neural network is trained with the same set of N-dimensional reference vectors to identify the N-dimensional vector of the unknown character using the same feature set.

The advantage is that the presence in the feature set of key features which are invariant under rotation of the image, or at least nearly so, enhances the reliability of the feature-based optical character recognition system of the invention relative to feature-based optical character recognition systems of the prior art.

BRIEF DESCRIPTION OF THE DRAWINGS

The invention is described below in detail by reference to the accompanying drawings, of which:

FIGS. 7A, 7B and 7C are pictorial diagrams illustrating the operation of the end point and branch point processor in the system of FIG. 1;

FIG. 15 illustrates an image corresponding to the example of FIG. 14;

FIG. 16 is a table illustrating a simple example of encoding features relating to the number of radial intercepts in an image; and FIG. 17 illustrates an image corresponding to the example of FIG. 16.

MODES OF CARRYING OUT THE INVENTION

Figure 1:
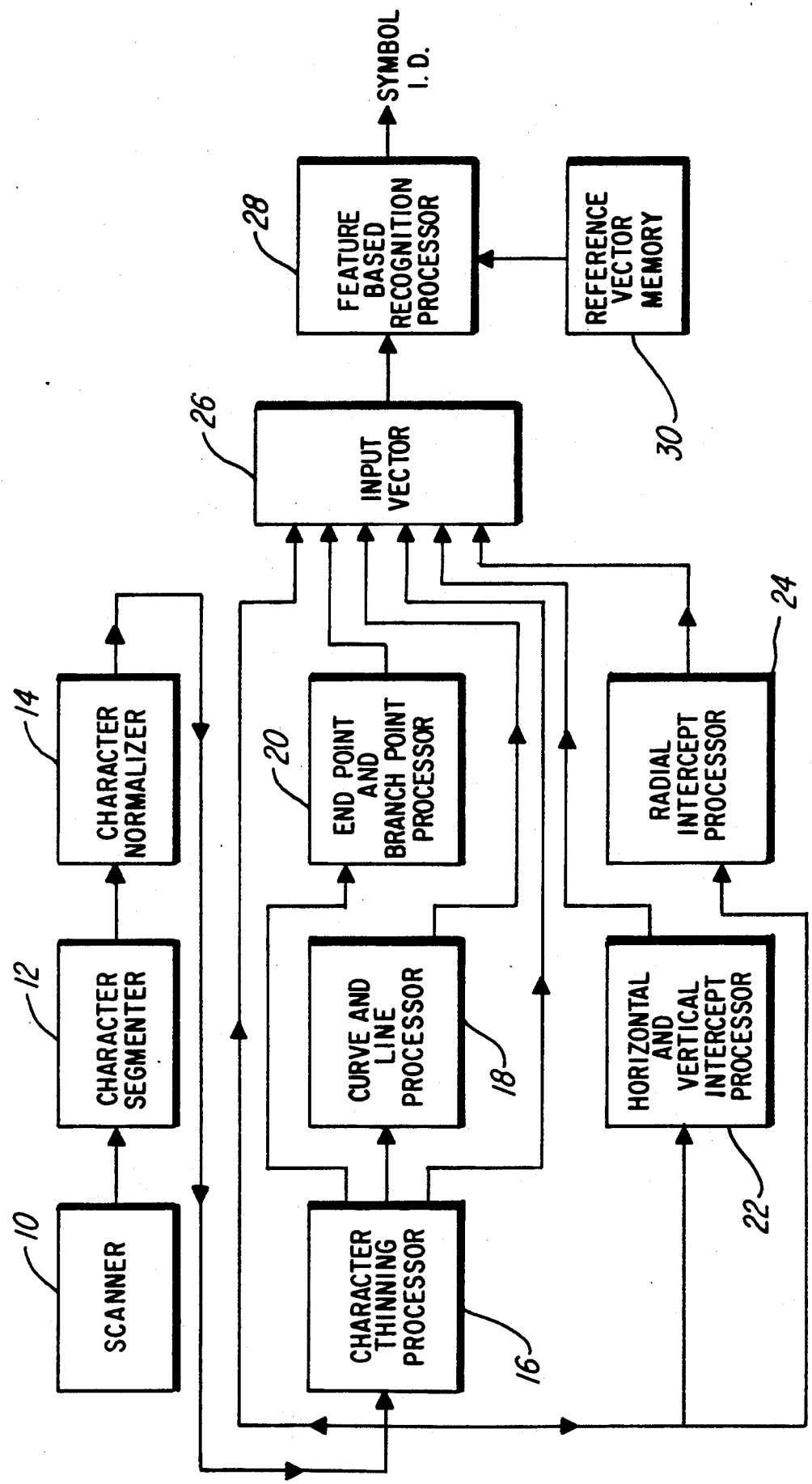
FIG. 1 is a block diagram of the system of the invention.

Referring to FIG. 1, a document scanner 10 generates binary data representing the image of a document. A segmenter 12 separates the images of individual characters in the document image using well-known techniques and a normalizer 14 adjusts the image of each character to a predetermined size and aspect ratio in accordance with known practice. A thinning processor 16 thins the strokes in the character image to generate a thinned character image. A curve and line processor 18 extracts features from the thinned character image in a manner described below. An end point and branch point processor 20 extracts end point and branch point features which are nearly rotationally invariant from the thinned character image. A horizontal and vertical intercept processor 22 extracts features relating to the number of intercepts between a set of horizontal and vertical lines and the normalized character image. A radial intercept processor 24 determines the number and location of intercepts in the image at a set of predetermined radii, the number of intercepts being a rotationally invariant feature of the character image.

The outputs of all the processors 16, 18, 20, 22 and 24 are combined with the binary data representing the character image to form an N-dimensional vector 26 of binary data. A feature-based recognition processor 28 computes the absolute distance between this vector and each one of a set of N-dimensional reference vectors stored in a memory 30 representative of a complete set of symbols. The recognition processor 28 identifies the character image with the symbol whose reference vector has the shortest absolute distance from the input vector 26.

Figure 2A:
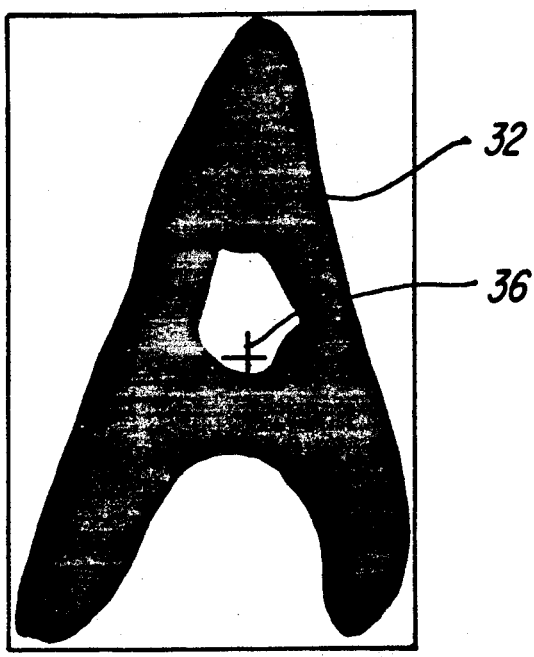
FIGS. 2A, 2B, 2C and 2D include pictorial diagrams and a chart illustrating the operation of a radial intercept processor in the system of FIG. 1.
Figure 2B:
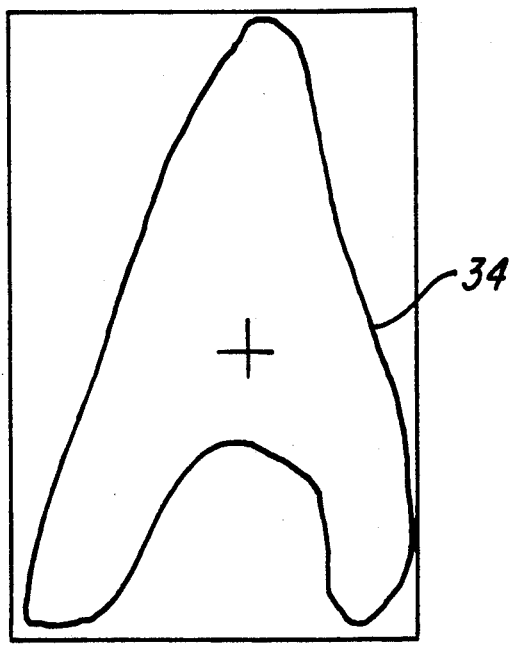
Figure 2C:
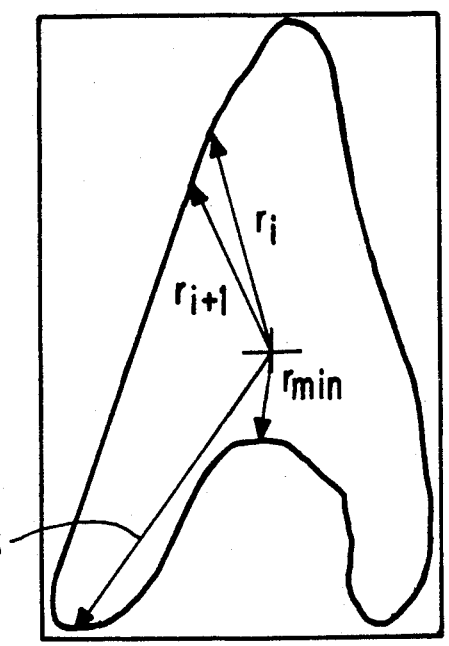
Figure 2D:
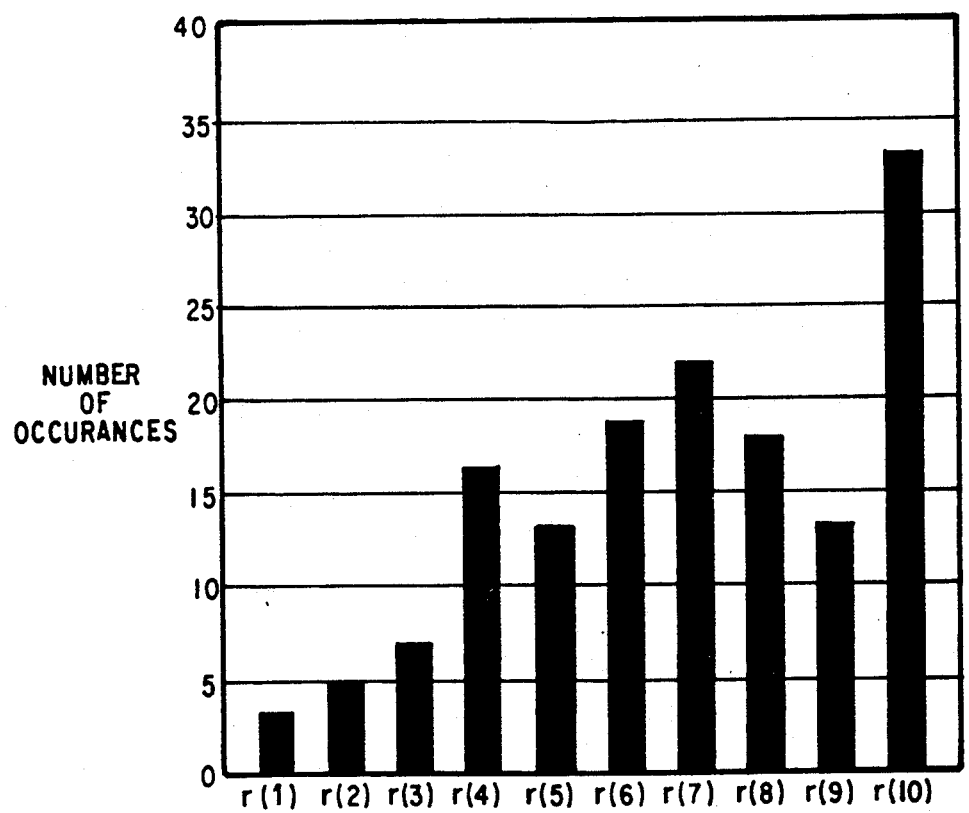

The radial intercept processor 24 generates the set of rotationally invariant features from the character image, such as the exemplary character image illustrated in FIG. 2A, by detecting the outer boundaries of the object 32 in the image received from the normalizer 14 to form an outline image 34 illustrated in FIG. 2B. As illustrated in FIG. 2C, the radial intercept processor 24 then counts the number of times the boundary of the outline image 34 intercepts each one of a plurality of predetermined radii $r_i$, using a simple Pythagorean algorithm. FIG. 2D illustrates the intercept count at each one of the radii Referring to FIG. 3, the radial intercept processor 24 begins by locating the centroid 36 of the object 32 of FIG. 2A (block 38 of FIG. 3), produces the outline image 34 (block 40 of FIG. 3). However, in the preferred embodiment of the invention, before counting the number of radial intercepts, the radial intercept processor 24 calculates the radial distances from the centroid 36 along a continuum of points on the boundary of the outline image 34 (block 42 of FIG. 3), to generate the data indicated in graphic form in FIG. 4. The radial intercept processor 24 then normalizes the radial distances plotted in FIG. 4 using any one of several well-known methods (block 44). For example, in one embodiment, the maximum radius in the outline image 34 is set to unity and all other radii are scaled accordingly. Then, in the preferred embodiment of the invention, the radial intercept processor selects a single radius $R_S$ at which intercepts by the outline image 34 are to be counted. In an alternative embodiment of the invention, intercepts are counted at a plurality of predetermined radii about the centroid 36.

Figure 3:
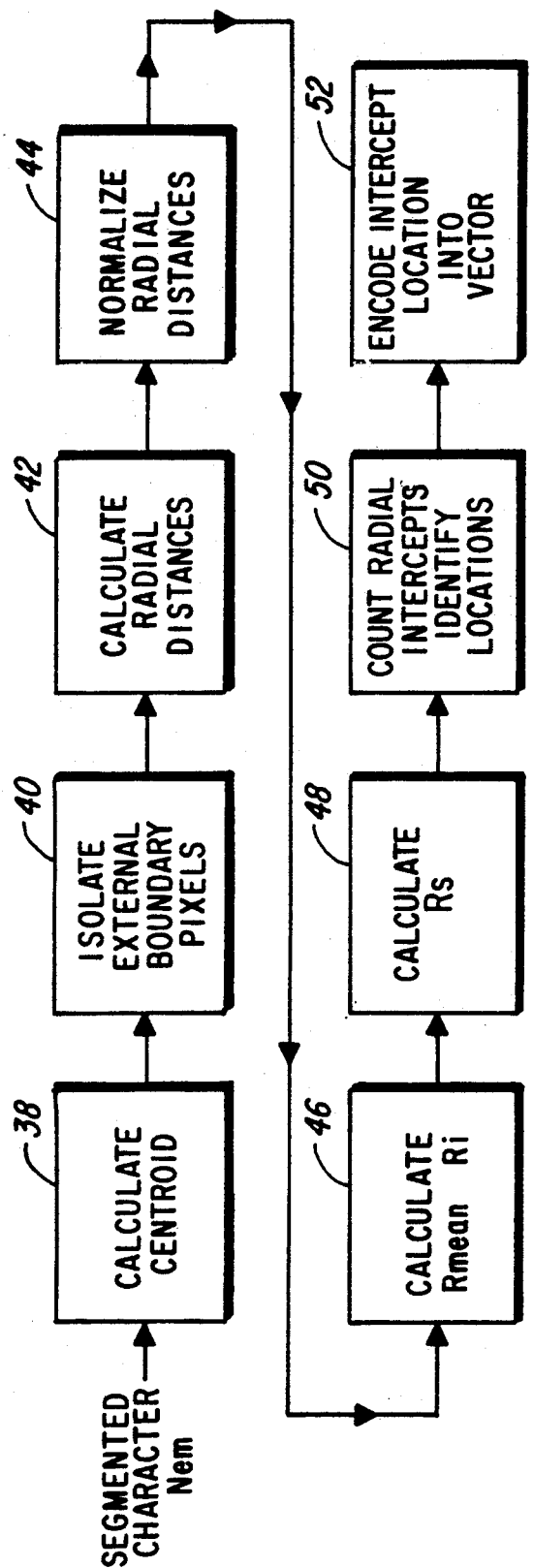
FIG. 3 is a flow diagram illustrating the operation of the radial intercept processor in the system of FIG. 1.
Figure 4:
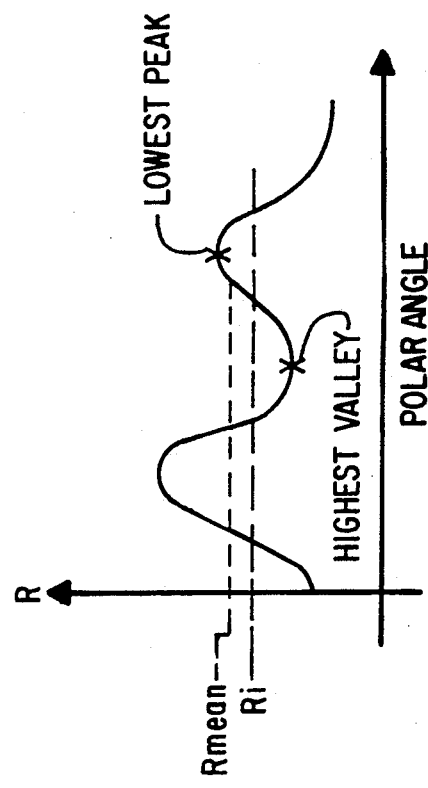
FIG. 4 is a graph representing a step depicted in the flow diagram of FIG. 3.

In selecting $R_S$, the radial intercept processor 24 first computes the mean $R_{mean}$ of all radii and another radius value $R_i$ which is halfway between the highest valley and the lowest peak in the graph of FIG. 4 (block 46 of FIG. 3). $R_S$ is then computed by the processor 24 as $[3R_i + R_{mean}]/4$, as indicated by block 48 of FIG. 3. The radial intercept processor 24 then counts the number of intercepts by the boundary of the outline image 34 at the radius $R_S$, identifies their locations (block 50) and encodes the results (block 52).

Figure 5:
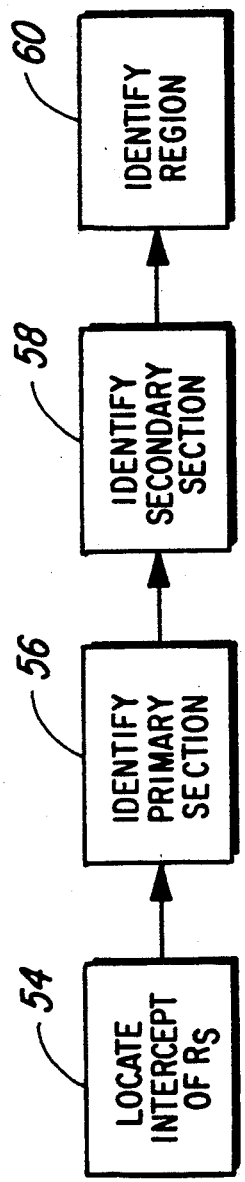
FIG. 5 is a flow diagram illustrating in detail a step depicted in the flow diagram of FIG. 3.
Figure 6:
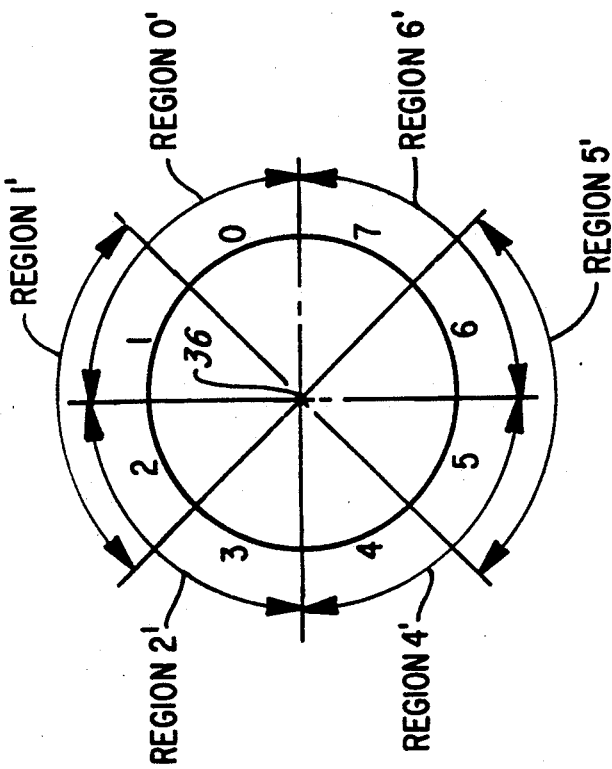
FIG. 6 is a pictorial diagram illustrating how radial intercept locations are classified in the process of FIG. 3.

Identifying the locations of the intercepts in the step of block 50 is illustrated in detail in the flow diagram of FIG. 5. For convenience, the circumference of the radius $R_S$ as superimposed in the outline image 34 of FIG. 2B is divided into eight pie-shaped polar sections labelled 0 through 7 in FIG. 6. There are eight regions, each region consisting of a pair of adjacent sections, as shown in FIG. 6. Each pair of adjacent sections is numbered in accordance with the lowest numbered section in the pair. Thus, the eight regions of FIG. 6 are numbered from 0' to 7', some of which are indicated in FIG. 6. Each radial intercept is identified in accordance with that one of the eight regions in which it resides. Since the eight regions are overlapping, the radial intercept processor 24 must first locate each intercept of $R_S$ (block 54 of FIG. 5), identify the two sections nearest the intercept (blocks 56 and 58 of FIG. 5) and identify the correct region as the one comprising the two sections nearest the intercept (block 60).

The number of radial intercepts is inherently invariant under rotation about any point near the centroid 36. The process of FIG. 5 renders the identification of the polar location of each radial intercept less susceptible to change in case of rotation of the document image because each such location is classified as one of the eight regions of FIG. 6.

Figure 8:
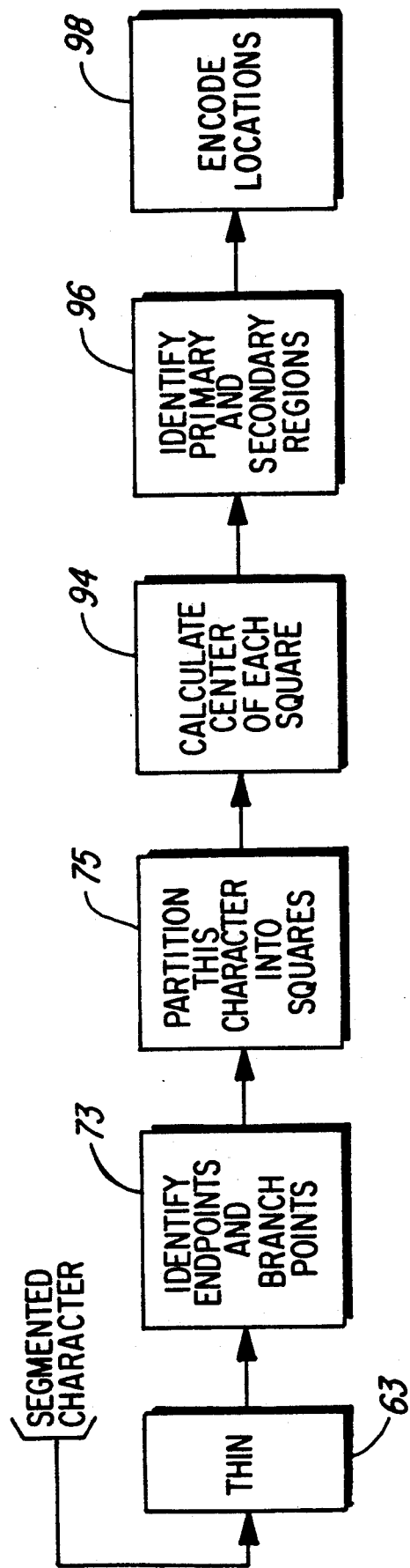
FIG. 8 is a flow diagram illustrating the operation of the end point and branch point processor of the system of FIG. 1.

The operation of the end point and branch point processor 20 is illustrated in the pictorial diagrams of FIGS. 7A, 7B and 7C and in the flow diagram of FIG. 8. To begin, the thinning processor 16 generates a thinned bit-map character image 62 of FIG. 7A from the normalized bit-map character image 32 of FIG. 2A using well-known techniques (block 63 of FIG. 8). The end point and branch point processor 20 then locates each end point 64, 66, 68 and each branch point 70, 72 in the thinned image 62, as illustrated in FIG. 7B, using well-known techniques (block 73 of FIG. 8). Then, the processor 20 superimposes a grid 74 on the thinned image 62 (block 75 of FIG. 8). As shown in FIG. 7B, the grid 74 is characterized by two intermediate height locations in the image, labelled h1 and h2 in FIG. 7B, and two intermediate width locations, labelled w1 and w2, dividing the image into nine rectangular regions with regional centers 76, 78, 80, 82, 84, 86, 88, 90, 92 (block 94 of FIG. 8).

The processor 20 then classifies each end point and each branch point in accordance with which pair of the regional centers is closest to the point (block 96 of FIG. 8). FIG. 7B illustrates this process in the exemplary case of the end point 64. Specifically, the processor 20 determines the distances d1, d2, d3, d4 between the end point 64 and the regional centers 78, 76, 80, 84, respectively, using well-known techniques. (For the sake of completeness, the processor 20 may determine the distances to all nine of the regional centers, although FIG. 7B illustrates the distances to the four nearest regional centers.) As shown, the distance d1 is the shortest while the distance d3 is the next shortest. Referring now to FIG. 7C, if the nine rectangular regions are numbered 1 through 9 and all twelve pairs of the nine regions are labelled A through L in the manner indicated in FIG. 7C, then it is seen that the end point 64 of FIG. 7B is closest to the centers 78 and 80 of the rectangular regions 2 and 3, and therefore is classified as being in the region pair B. All of the end points 64, 66, 68 and branch points 70, 72 are individually classified in a similar manner in accordance with the foregoing process. This classification corresponds to the step of block 98 of FIG. 8. In actual practice, of course, all of the foregoing labels are binary, the foregoing alphanumeric labels being used in the present description for convenience only.

The advantage of the foregoing end point and branch point classification process is that each pair of regions A through L of FIG. 7C is relatively large, containing a large number of image pixels. Thus, in the vast majority of cases, the bit-map image may be rotated through a finite angle without changing the classification performed by the processor 20. In contrast, if each end point and branch point were simply classified in accordance with its exact pixel location in the bit-map image, even the slightest rotation would drastically change its classification. As a result, any document skew would seriously impair the optical character recognition process. The advantage of the invention is that the probability of such an occurrence is dramatically reduced for the end point and branch point feature classification.

In addition to the two foregoing rotationally invariant or stable features (i.e., the radial intercepts and the end point/branch point grid locations), additional features which are not necessarily as rotationally stable or invariant are extracted from the character image by the curve and line processor 18 and by the horizontal and vertical intercept processor 22 of FIG. 1 in order to provide a sufficiently comprehensive set of extracted features to ensure a high probability of unambiguous character recognition in all cases. The operations of the curve and line processor 18 and the horizontal and vertical intercept processor 22 will be described with reference to the pictorial diagram of FIG. 9.

Figure 9:
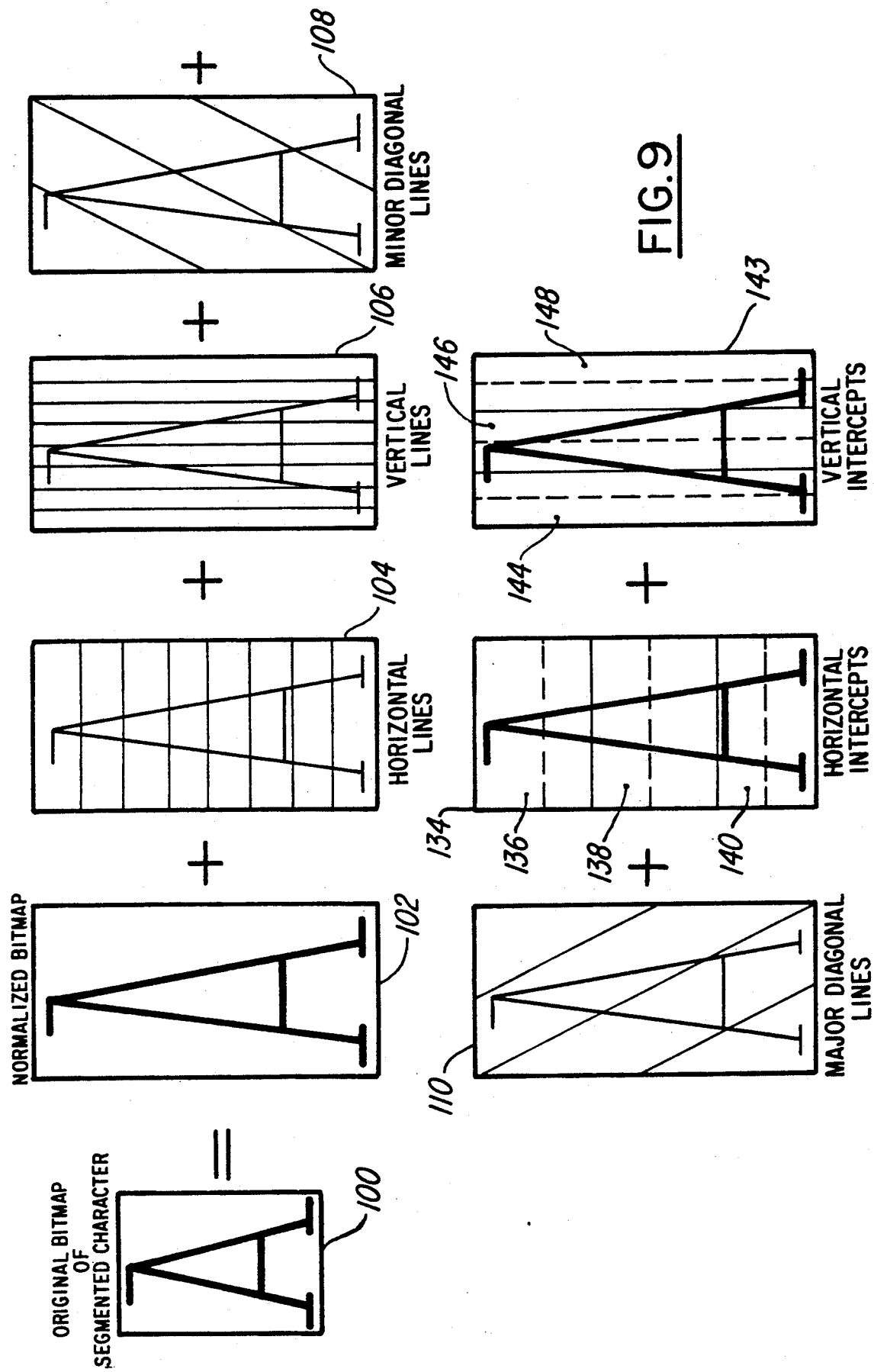
FIG. 9 is a pictorial diagram illustrating the operation of a portion of the system of FIG. 1.

In step 100 of FIG. 9, the segmenter 10 of FIG. 1 generates an original bit-map image of m rows and n columns of pixels, which the normalizer 12 of FIG. 1 normalizes to an image of 24 rows and 12 columns in step 102 of FIG. 9. The thinning processor 16 generates a thinned character image which is used in steps 104, 106, 108, 110, 112, 114 and 116 of FIG. 9.

In step 104, the curve and line processor 18 divides the image into eight horizontal regions and classifies the image in accordance with which ones of the eight horizontal regions have more "ON" pixels than a predetermined threshold number. In step 106, the processor 18 divides the image into eight vertical regions and classifies the image in accordance with which ones of the eight vertical regions have more "ON" pixels than the predetermined threshold number. In step 108, the processor 18 divides the image into four minor diagonal regions along three minor diagonal boundaries and classifies the image in accordance with which ones of the four minor diagonal regions have more "ON" pixels than the predetermined threshold number. In step 110, the processor 18 divides the image into four major diagonal regions along three major diagonal boundaries and classifies the image in accordance with which ones of the four major diagonal regions have more "ON" pixels than the predetermined threshold number.

Figure 10:
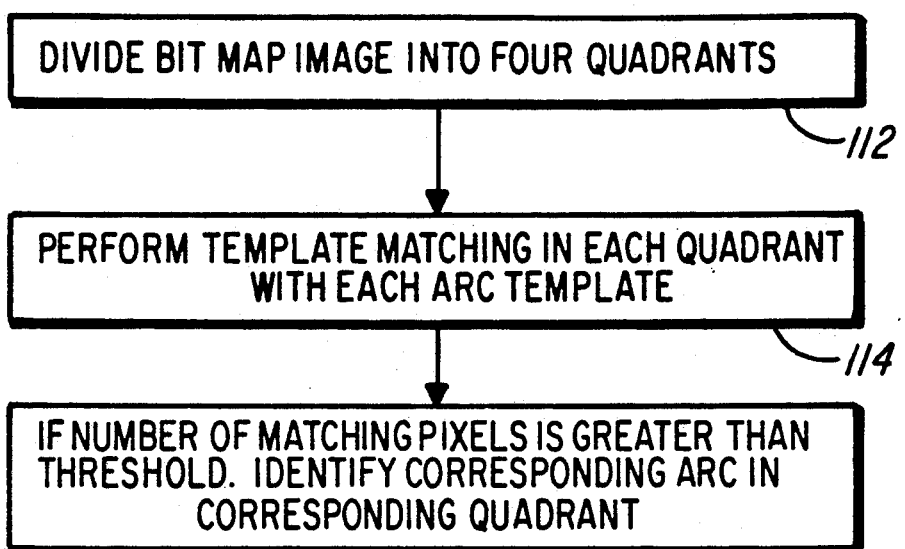
FIG. 10 is a flow diagram illustrating one aspect of the operation of a curve and line processor in the system of FIG. 1.
Figure 11:
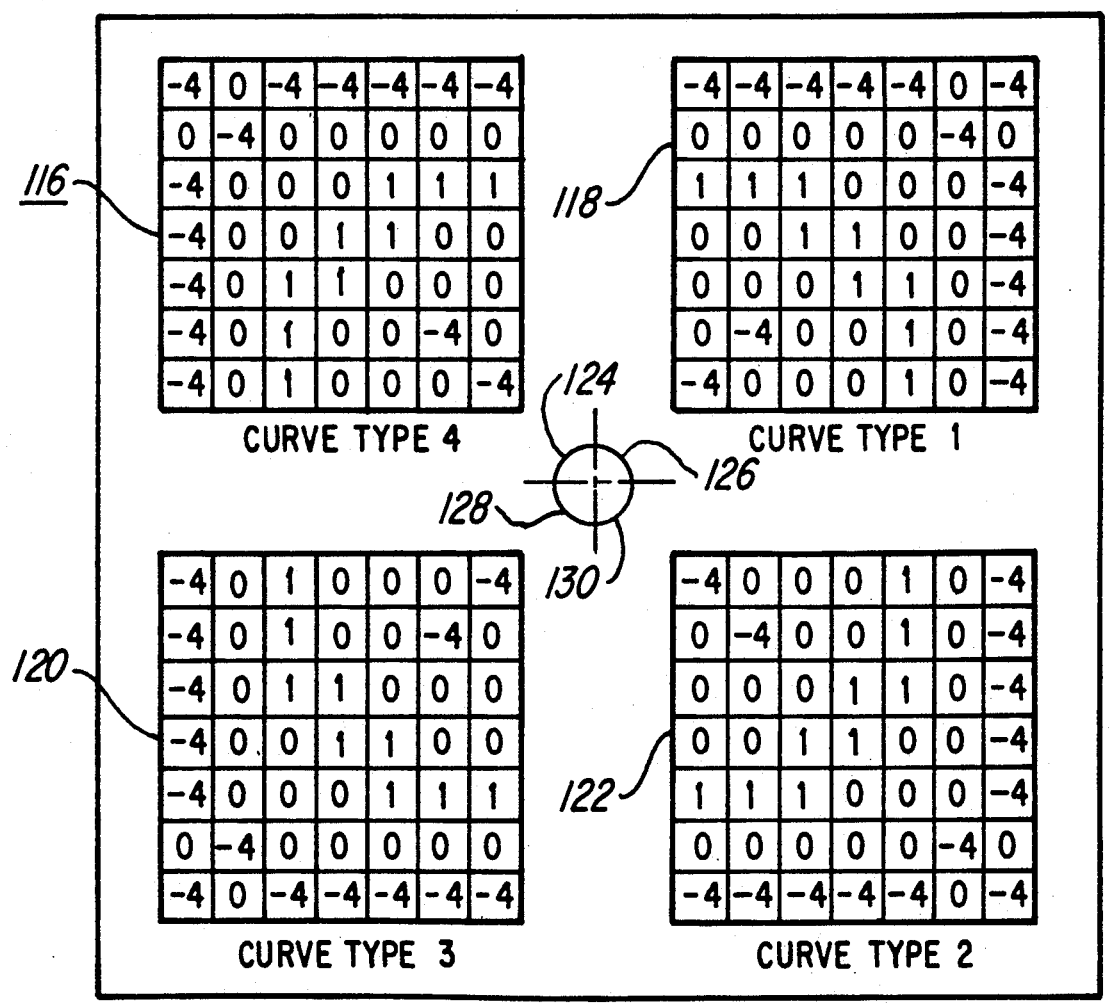
FIG. 11 is a diagram illustrating curvature templates employed in the process of FIG. 10.

An additional process carried out by the curve and line processor 18 is illustrated in the flow diagram of FIG. 10. In this additional process, the processor 18 divides the image into four rectangular quadrants (block 112 of FIG. 10). The processor 18 then searches within each quadrant for a match with each one of four quarter-arc templates 116, 118, 120, 122 illustrated in FIG. 11, corresponding respectively to the quarter-arcs 124, 126, 128, 130 as indicated in FIG. 11 (block 114 of FIG. 10). This step is performed in accordance with well-known template matching techniques. One way of doing this is to separately convolve the individual image in each rectangular quadrant with each of the four quarter-arc templates. If the number of "ON" pixels in a quadrant of an image matching the "ON" pixels of a template exceeds a threshold, a match is declared and the image is classified in accordance with the matching quadrant and the matching template (block 132 of FIG. 10). Each rectangular quadrant of the image is classified in accordance with the foregoing process.

In step 134 of FIG. 9, the horizontal and vertical intercept processor 22 receives the normalized character bit-map image directly from the normalizer 14 (bypassing the thinning processor 16). The processor 22 divides this image into three horizontal regions 136, 138, 140. Then, along each one of three pixels rows (indicated by dashed lines) bisecting the three horizontal regions 136, 138, 140, the processor 22 counts the number of intercepts with "ON" pixels in the image. In step 143 of FIG. 9, the processor 22 divides the image into three vertical regions 144, 146, 148 and counts the number of intercepts with "ON" pixels along each one of three pixel columns bisecting the three vertical regions 144, 146, 148. Each count thus obtained is stored as a feature of the image.

The feature classification data generated from the character bit-map image by each of the processors 18, 20, 22, 24 of FIG. 1 in the foregoing manner are combined together sequentially as a series of data bits to form an input vector 26 characterizing the features extracted from the image. The feature-based recognition processor 28 compares the input vector to a set of reference vectors stored in the memory 30 and n the basis of that comparison determines the identity of the character in the image.

Construction of the input vector 26 is illustrated in simplified tutorial examples illustrated in FIGS. 12 through 17. It should be noted that the 4-by-4 pixel image of the tutorial example of FIGS. 12 and 13 was selected for the sake of simplicity, although its division into three horizontal and vertical regions necessitated some assymetries, as will be seen below.

The input vector 26 consists of the bit-map image data 150, the horizontal line feature classification data 152 generated by step 104 of FIG. 9, the vertical line feature classification data 154 generated by step 106 of FIG. 9, the minor diagonal line feature classification data 156 generated by step 108, the major diagonal feature classification line data 158 generated by step 110, the horizontal intercept feature classification data 160 and vertical intercept feature classification data 162 generated by steps 134 and 143 of FIG. 9, the end point feature classification data 164 and branch point feature classification data 166 generated by the processor 20, the quarter-arc feature classification data 168 generated by the process of FIG. 10 and the radial intercept feature classification data 170 generated by the processor 24. In the following examples, the bits in the input vector 26 are not binary encoded, so that counts are represented by the number of "1" bits present in a given group of bits.

Figure 12:
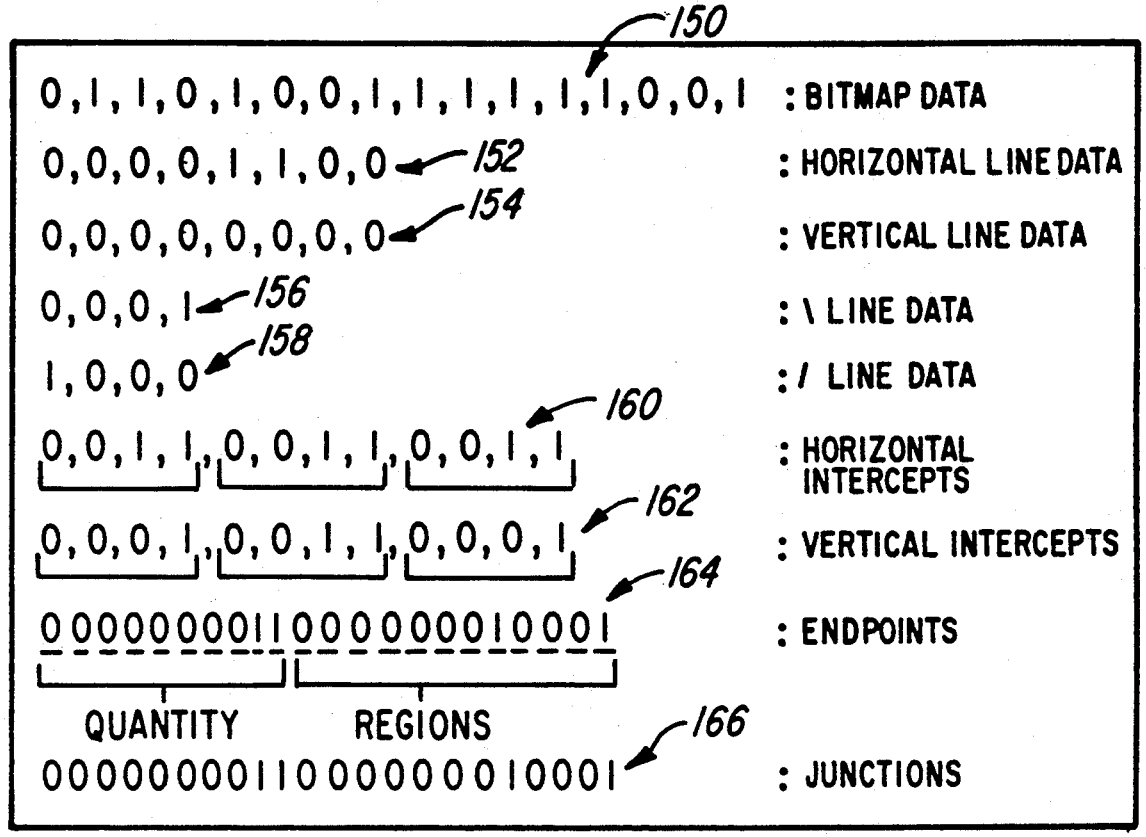
FIG. 12 is a table illustrating a simple example of the encoding of some of the features extracted by the system of FIG. 1.
Figure 13:
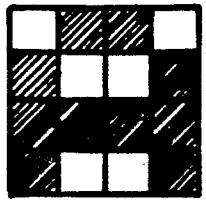
FIG. 13 illustrates the four-by-four binary image example corresponding to FIG. 12.

All of the feature classification data in FIG. 12 were generated for the simplified tutorial example of a 4-by-4 pixel image illustrated in FIG. 13. Thus, there are 16 bits in the bit-map data 150. There are eight bits in the horizontal line data 152 and in the vertical line data 154 corresponding to the eight horizontal regions in step 104 and eight vertical regions of FIG. 9. There are four bits is the minor diagonal line data 156 and in the major diagonal line data 158 corresponding to the four minor and major diagonal regions of steps 108 and 110.

There are three sets of four bit groups in the horizontal intercept data 160 and in the vertical intercept data 162, corresponding to the three horizontal intercept lines and three vertical intercept lines indicated in dashed line in FIG. 13.

There are twenty-one bits in the end point feature classification data 164. The first nine bits indicate the presence of an end point in each one of the nine regions in the grid 74 of FIG. 7B superimposed onto the character bit-map of FIG. 13. The last twelve bits indicate the presence of an end point in each one of the twelve pairs of regions defined in FIG. 7C, beginning at the region labelled A and ending with the region labelled L in FIG. 7C.

There are twenty-one bits in the branch point feature classification data 166 organized in the same manner as the twenty-one bits of the end point feature classification data 164.

Figure 14:
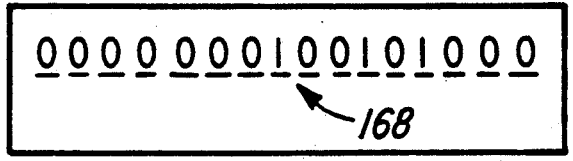
FIG. 14 is a table illustrating a simple example of encoding features relating to the presence of quarter-arcs in each quadrant of an image.

Referring now to FIG. 14, the quarter-arc feature classification data 168 corresponds to the tutorial example illustrated in FIG. 15 of the bit-map image of a capital letter "C". In accordance with the process of FIG. 10, each of the quarter-arc templates of FIG. 11 has been convolved with the individual image in each one of the four quadrants 172, 174, 176, 178 of the bit-map image of FIG. 15. The results are organized in the data of FIG. 14 as follows each one of the four-bit groups indicates the presence (or absence) of a match with the corresponding one of the four quadrant-arc templates. Each one of four bits in a group corresponds to one of the four quadrants 172, 174, 176, 178, respectively.

The radial intercept feature classification data 170 of FIG. 16 corresponds to the simplified tutorial example of the bit-map image of FIG. 17, comprising a capital letter "A", the eight sector map of FIG. 6 being superimposed and centered at the centroid 36 of the letter "A". The radius $R_S$ is indicated in dashed line in FIG. 17. The eight two-bit pairs in the radial intercept data 170 of FIG. 16 represent the number of intercepts in corresponding ones of the eight sectors in numerical order. This data is not binary encoded. Thus, two intercepts in a sector is indicated by two binary "ones".

All of the feature classification data 150, 152, 154, 156, 158, 160, 162, 164, 166, 168, 170 in serial order comprise the input vector 126 received by the feature based recognition processor 28. In one embodiment, the feature-based recognition processor 28 computes the absolute distance between the input vector 126 and each one of the reference vectors stored in the memory 30. The feature-based recognition processor 28 identifies the character in accordance with the reference vector having the smallest distance to the character image vector. The reference vectors stored in the memory 30 are created by feeding a complete set of known symbols to the scanner 10 and storing the input vector 26 generated for each one of the symbols in the memory 30. As computed by the processor 28, the absolute distance between two n-dimensional vectors $(a_1, a_2, a_3, \ldots, a_n)$ and $(b_1, b_2, b_3, \ldots, b_n)$ is:

$$|a_1-b_1|+|a_2-b_2|+|a_3-b_3|+\ldots+|a_n-b_n|.$$

Alternatively, the feature-based recognition processor 28 may be a neural network.

The system of FIG. 1 was implemented on a computer using the C-language programs in the computer program listings of Appendices A and B of this specification. The program in Appendix B implements the radial intercept feature extraction process of FIGS. 3 and 5. The portion of the program on pages A109–A127 of Appendix A implements the end point and branch point feature extraction process of FIG. 8. Notice is hereby given that Eastman Kodak Company owns the copyright in the programs listed in Appendices A and B hereof.

INDUSTRIAL UTILITIES AND ADVANTAGES

The invention is useful in feature-based optical character recognition of both printed and hand-written characters. An advantage of the invention is that its performance is less susceptible degradation by document skew or rotation of the character images.

While the invention has been described in detail by specific reference to preferred embodiments thereof, it is understood that variations and modifications may be made without departing from the true spirit and scope of the invention.

APPENDIX A

Copyright 1990 Eastman Kodak Company

```c
#include <stdio.h>
#include "[beato.ocr]header.h"
#include "[beato.neural.bis]Lookup.h"
#include "[beato.neural.bis]Predict.h"
#include "[beato.neural.bis]scale.h"

#define NETDEPTH           1000
#define MAXSIZE            500
define DPI                200 define ESC 27 define START_OF_TEXT_LINE   0
define MIDDLE_OF_TEXT_LINE  1
#define END_OF_TEXT_LINE     2
define IDLE                 3 define U_CASE   0
define L_CASE   1
#define DIGIT    2
#define SYMBOL   3
define SPACE    4 int  HORIZONTAL_RESOLUTION= 24;
int  VERTICAL_RESOLUTION=   12;
int  NUMFEATUREBITS=        132;

#define STANDARDCHARHEIGHT  100
#define STANDARDCHARWIDTH   100
```

```c
#define    NORM_HORIZONTAL_RESOLUTION    32
#define    NORM_VERTICAL_RESOLUTION 32
#define    NUMSCALEDIMAGEBITS        HORIZONTAL_RESOLUTION
* VERTICAL_RESOLUTION int    LineCounter = 0;
int    TextLineCounter = 0;
int    CurrentChar, PreviousChar;
int    NumberOfObjects;

int    CharacterType[4] = {U_CASE, L_CASE, DIGIT, SYMBOL};

short     NumberOfOutputUnits,
    NumberOfHiddenUnits,
    NumberOfInputUnits;

int    BaseLine,
    DeltaBaseLine,
    TopLine,
    CharacterWidth;

FILE *fp, *fopen();
/* FILE      *debugfp; */
BOOLEAN *debugptr;
int  Position, WordCounter;

int    NumberOfReps;

int    Horiz_Histogram [5000], Vert_Histogram[4000];

short     GetNumberOfInputUnits(),
    GetNumberOfOutputUnits();
    GetNumberOfHiddenUnits();
```

```
double    *InputUnit;

/* Declarations for the Weight and Bias Matrices */ double    LearningRate = 0.1,
          Momentum     = 0.9;

struct    CandidateStruct    {
                    char FirstCharacter;
                    double   FirstScore;
                    char SecondCharacter;
                    double   SecondScore;
               } Candidate;

struct    TextLineStruct {
                    int  StartLine;
                    int  EndLine;
                    int  StartCol;
                    int  EndCol;
                    int  Height;
                    int  Width;
               } TextLine;

struct    TextStruct    {
                    int  StartLine;
                    int  EndLine;
               } Text;

struct    WordStruct    {
                    struct    TextLineStruct
CharacterData[132];

int  TopLine;
                    int  BaseLine;
```

```c
        int     CharacterCount;
    } Word[100];

char    OutputCharacter;
int     CharacterCount, ObjectCounter;
/*****************************************************/
main()
{
int         Param1, Param2;
static  char    Filename[80];
static  char    Header[10];
static  int     RecLength, ReadFileNumber,
StartingLineNumber, StartingColumnNumber;
static      BOOLEAN
ThinBufPtr[STANDARDCHARHEIGHT][STANDARDCHARWIDTH];
static      BOOLEAN
NormThinBufPtr[NORM_HORIZONTAL_RESOLUTION][NORM_VERTICAL_
RESOLUTION];
static      BOOLEAN   SaveOrigFlag, SaveNormFlag,
SaveNormThinFlag, SaveBorderFlag;
static  char    SaveOrigAns[10], SaveNormAns[10],
SaveNormThinAns[10], buildans[10];
static  char    SaveBorderAns[10];
static      int NumberOfLines;
static      int Line;
static  int X, Y, EndLine;
static  int     I, J,LineWidth;
static      int State;
static      BYTE PackedLineBuf[1024];
static  int     LastPixelColumn;
static      BOOLEAN
```

```
SecondLineBufPtr[NORM_HORIZONTAL_RESOLUTION+4][NORM_VERTICAL_RESOLUTION+4];
static    BOOLEAN LineBufPtr[300][4000];
static    BOOLEAN   buildflag;
long offset = 0L;

ReadFileNumber = 8;
    Param1 = Param2 = 1;
    RecLength = 0;
    ObjectCounter = 0;

fp = fopen ("machineprint_wfeat.data", "w");
/*  debugfp = fopen ("debugfile.data", "w"); */

Lib$Erase_Page (&Param1, &Param2);
    printf ("This program will generate a training file for neural network\n");
    printf ("                        L. L. Barski\n");

/* If file is not found, RecLength will be 0 */
    while (RecLength == 0)
    {
        printf ("Input file name ->");
        scanf ("%s",Filename);

RecLength = FileRecLen (Filename);
        printf ("\n\nNumber of pixels per line -> %d\n",(RecLength*8));
        if (RecLength == 0)
            printf ("\nFILE NOT FOUND, please try again\n");
    }

NumberOfLines = FileRecordCount(Filename);
    printf ("\n\nNumber of lines in image -> %d\n", NumberOfLines);
```

```c
    if (NumberOfLines > 4400)
        NumberOfLines = 4400;

StartingLineNumber = 00;

printf ("HORIZONTAL RESOLUTION -> %d\n",
HORIZONTAL_RESOLUTION);

NumberOfInputUnits =    HORIZONTAL_RESOLUTION *
                    VERTICAL_RESOLUTION + NUMFEATUREBITS;

InputUnit = (double *) malloc (   sizeof (double) *
                        NumberOfInputUnits);
    if (InputUnit == NULL)
        printf ("Could not allocate Input Buffer\n");

printf ("Do you want to build a TRAINING file?? --> ");
    scanf ("%s",buildans);
    printf ("\n");
    if ( (buildans[0] == 'Y') || (buildans[0] == 'y'))
    {
        buildflag = TRUE;
        printf ("Enter the desired number of samples per\n");
        printf ("character to used in training (<= 10) -> ");
        scanf ("%d", &NumberOfReps);
        printf ("\n");
    }
    else buildflag = FALSE;

printf ("Do you want to save individual objects ?? --> ");
    scanf ("%s",SaveOrigAns);
```

```
    printf ("\n");
    if ( (SaveOrigAns[0] == 'Y') || (SaveOrigAns[0] ==
'y'))
        SaveOrigFlag = TRUE;
    else SaveOrigFlag = FALSE;

printf ("Do you want to save individual NORMALIZED
objects ?? --> ");
    scanf ("%s",SaveNormAns);
    printf ("\n");
    if ( (SaveNormAns[0] == 'Y') || (SaveNormAns[0] ==
'y'))
        SaveNormFlag = TRUE;
    else SaveNormFlag = FALSE;

printf ("Do you want to save individual NORMALIZED
THINNED objects ?? --> ");
    scanf ("%s",SaveNormThinAns);
    printf ("\n");
    if ( (SaveNormThinAns[0] == 'Y') ||
(SaveNormThinAns[0] == 'y'))
        SaveNormThinFlag = TRUE;
    else SaveNormThinFlag = FALSE;

BuilderSupport( Header );

OpenReadSeekFile (&ReadFileNumber, Filename);

LineWidth = RecLength << 3;

Y = 0;

for (Line = 0;
```

```
            Line < NumberOfLines;

Line ++)

{

/* Start Reading lines */
            GetLine (PackedLineBuf,
                  LineBufPtr[Y+1],
                  RecLength,
                  Line,
                  ReadFileNumber,
                  DO_UNPACK);

DoHorizontalHistogram (  &State,
                        LineBufPtr[Y+1],
                        LineWidth,
                        TRUE);

/* Check to see if we are starting a new
text line */
            switch (State)
            { case START_OF_TEXT_LINE:
                        Y++;
                        break;

case MIDDLE_OF_TEXT_LINE:
                        Y++;
                        break;

case END_OF_TEXT_LINE:

DoVerticalHistogram (    LineBufPtr,
                                    0,
                                    Y - 1,
```

```
                    LineWidth,
                    &LastPixelColumn);

GetCharacters ( LineBufPtr,
                0,
                Y - 1,
                LineWidth,
                2,
                LastPixelColumn);
        /* Reject noise */
        if (WordCounter >= 10 && buildflag ==
TRUE)
        {
                DecodeCharacters(LineBufPtr,
                        SecondLineBufPtr,
                        ThinBufPtr,
                        NormThinBufPtr,
                        SaveOrigFlag,
                        SaveNormFlag,
                        SaveNormThinFlag,
                        0);
                LineCounter++;
                printf ("%d line with %d
height\n",LineCounter,
                                Y-1);
                Y = 0; /* Reset the buffer line
counter */
                break;
        }
        else if (buildflag == FALSE)
        {
                DecodeTestCharacters(LineBufPtr,
                        SecondLineBufPtr,
                        ThinBufPtr,
```

```
                    NormThinBufPtr,
                    SaveOrigFlag,
                    SaveNormFlag,
                    SaveNormThinFlag,
                    0);
                LineCounter++;

printf ("%d line with %d \
height\n",LineCounter, \
                    Y-1);
                Y = 0; /* Reset the buffer line counter */ break;
            } default:
            break;
        }
    } if (ObjectCounter != NumberOfObjects && buildflag == TRUE)
        printf (">>>> ERROR >>>> %d Objects\n",ObjectCounter);
    else printf ("%d Objects\n",ObjectCounter);

CloseFile (&ReadFileNumber);
    fclose (fp);

/* write the correctn number of objects to the machineprint_wfeat.data
       file */ if (Header[0] == 'y' || Header[0] == 'Y')
    {
```

```
        fp = fopen ("machineprint_wfeat.data", "a");
        fseek (fp, (offset+34), 0);
        fprintf (fp, "%d #characters\n",
ObjectCounter);
        fclose (fp);
    }
}

/***********************************************/
DecodeCharacters(   LineBufPtr,
            SecondLineBufPtr,
            ThinBufPtr,
            NormThinBufPtr,
            SaveOrigFlag,
            SaveNormFlag,
            SaveNormThinFlag,
            SaveBorderFlag)
BOOLEAN    LineBufPtr[300][4000],
ThinBufPtr[STANDARDCHARHEIGHT][STANDARDCHARWIDTH], NormThinBufPtr[NORM_HORIZONTAL_RESOLUTION][NORM_VERTICAL_
RESOLUTION];
BOOLEAN
SecondLineBufPtr[NORM_HORIZONTAL_RESOLUTION+4][NORM_VERTI
CAL_RESOLUTION+4];
BOOLEAN    SaveOrigFlag, SaveNormFlag, SaveNormThinFlag,
SaveBorderFlag;
{
static    BOOLEAN
BoundaryBufPtr[STANDARDCHARHEIGHT][STANDARDCHARWIDTH];
static    char    filename[10];
static    int    I, J,numfeatures, stroke_width;
static    int    Index, reclength, WriteFileNumber = 19;
register double *TempPtr, *OutputPtr;
static    int    X, M, RecLength;
```

```
static  double  *TempVector;
static  int     NormEndLine, NormEndCol, Xdim, Ydim,
XNormdim, YNormdim;
static  int     Chains [MAXSIZE], ncodes, LineStart,
ColStart;
static  float   perimeter, xbar, ybar;

TempVector = (double *) malloc (sizeof (double) *
100);

PreviousChar = SPACE;

if (WordCounter >= 10)
    {
        if (WordCounter > 10)
        {
            printf ("*** %d *** characters in this
line (checking for noise) \n",WordCounter);
            DumpData();
        }
        TextLineCounter++;
        for (I = 0; I < NumberOfReps; I++)
        {
            for (J = 0; J < Word[I].CharacterCount;
J++)
            {
                /* Check for noise */
                if (Word[I].CharacterData[J].Height >

(0.5 *
(Text.EndLine-Text.StartLine)))
                    {
                        ScaleAndBuildInputData
(LineBufPtr,
```

```
                Word[I].CharacterData[J].StartLine,

Word[I].CharacterData[J].EndLine,

Word[I].CharacterData[J].StartCol,

Word[I].CharacterData[J].EndCol);

for (X = 0; X < NUMSCALEDIMAGEBITS; X++)
                {
                        if (InputUnit[X] == 1.0)
                                fprintf (fp,"1 ");
                        else fprintf (fp,"0 ");
                } if (SaveOrigFlag == TRUE)
                {
                        RecLength = 8;
                        sprintf (filename, "%dORIG", ObjectCounter);
                        OpenWriteFile (&WriteFileNumber, filename, &RecLength);
                        for (M = Word[I].CharacterData[J].StartLine;
                             M < Word[I].CharacterData[J].EndLine;
                             M++)
                        {

PutSeqLine(&LineBufPtr[M][Word[I].CharacterData[J].StartCol),
                                       RecLength,
                                       WriteFileNumber );
```

```
            }
            CloseFile
(&WriteFileNumber);
    }

/* Because machine can be small in size, the
character is normalized to
        32X32 prior to feature extraction. The
normalized character is stored           in
SecondLineBufPtr */

Norm_Orig_With_Beato_Scaler (
LineBufPtr,

SecondLineBufPtr,

Word[I].CharacterData[J].StartLine,

Word[I].CharacterData[J].EndLine,

Word[I].CharacterData[J].StartCol,

Word[I].CharacterData[J].EndCol);

NormEndLine=NORM_HORIZONTAL_RESOLUTION+4;
            NormEndCol

=NORM_VERTICAL_RESOLUTION+4;
```

```
            if (SaveNormFlag == TRUE)
            {
                RecLength = 8;
                sprintf (filename, "%d",
ObjectCounter);
                OpenWriteFile
(&WriteFileNumber, filename, &RecLength);
                for (M = 0;
                  M < NormEndLine;
                  M++)
                {
                  PutSeqLine (
&SecondLineBufPtr[M][0],
                                RecLength,
WriteFileNumber );
                }
                CloseFile
(&WriteFileNumber);
            }

ExtractGenOrigBitmapFeaturesV2(
SecondLineBufPtr,
                                        0,
                                        0,
NormEndLine, NormEndCol, TempVector, &numfeatures);

for (X =0; X < numfeatures; X++)
            {
```

```
                    if (TempVector[X] == 1.0)
fprintf (fp, "1 ");
                    else if (TempVector[X] ==
0.5) fprintf (fp, ".5 ");
                    else fprintf (fp, "0 ");
                }

/* Thin the character using L. Tan's
thinning algorithm   */

Get_Stroke_WidthVer2 (
SecondLineBufPtr,
                        0,
                        0,
                        NormEndLine,
                        NormEndCol,
                        &stroke_width);

Thin_TanVer2 ( SecondLineBufPtr,
                        0,
                        0,
                        NormEndLine,
                        NormEndCol,
                        ThinBufPtr,
                        stroke_width);

if (SaveNormThinFlag == TRUE)
                {
                        RecLength = 8;
                        sprintf (filename, "%d",
ObjectCounter);
                        OpenWriteFile
(&WriteFileNumber, filename, &RecLength);
                        for (M = 0;
                            M < NormEndLine;
```

```
                    M++)
                    {
                     PutSeqLine (
&ThinBufPtr[M][0],
                              RecLength,
WriteFileNumber );

}
                    CloseFile
(&WriteFileNumber);

}

ExtractTemplateFeaturesVer2 (
ThinBufPtr,
                                        0,
                                        0,
                                   NormEndLine,
                                   NormEndCol, ObjectCounter,
                                   TempVector, &numfeatures);

for (X =0; X < numfeatures; X++)
                    {
                     if (TempVector[X] == 1.0)
fprintf (fp, "1 ");
                     else if (TempVector[X] ==
0.5) fprintf (fp, ".5 ");
                     else fprintf (fp, "0 ");
                    }

ExtractCurvatureFeatures (
ThinB °Ptr,
```

```
                                0,
                                0,
                                NormEndLine,
                                NormEndCol,
                                ObjectCounter,
                                TempVector,
                                &numfeatures);

for (X =0; X < numfeatures; X++)
                        {
                                if (TempVector[X] == 1.0)
fprintf (fp, "1 ");
                                else if (TempVector[X] ==
0.5) fprintf (fp, ".5 ");
                                else fprintf (fp, "0 ");
                        } fseek (fp, -1, 1);
                        fprintf (fp,"\n");
                        WriteTargetString
(ObjectCounter++);
                        if (ObjectCounter%50 == 0)
                                printf ("Writing object
%4d\n",ObjectCounter);

}
                        else
                        {
                        printf ("Disregard object %d in
this line\n",I);
                        }
                    }
                }
            }
```

```
    else
    {
        printf ("*** %d *** characters in this line
(checking for noise) \n",WordCounter);
        DumpData();
    }
}

/*************************************************/
DecodeTestCharacters(   LineBufPtr,
            SecondLineBufPtr,
            ThinBufPtr,
            NormThinBufPtr,
            SaveOrigFlag,
            SaveNormFlag,
            SaveNormThinFlag,
            SaveBorderFlag)
BOOLEAN    LineBufPtr[300][4000],
ThinBufPtr[STANDARDCHARHEIGHT][STANDARDCHARWIDTH], NormThinBufPtr[NORM_HORIZONTAL_RESOLUTION][NORM_VERTICAL_
RESOLUTION];
BOOLEAN
SecondLineBufPtr[NORM_HORIZONTAL_RESOLUTION+4][NORM_VERTI
CAL_RESOLUTION+4];
BOOLEAN    SaveOrigFlag, SaveNormFlag, SaveNormThinFlag,
SaveBorderFlag;
{
static    BOOLEAN
BoundaryBufPtr[STANDARDCHARHEIGHT][STANDARDCHARWIDTH];
static    char    filename[10];
static    int    I, J,numfeatures, stroke_width;
static    int    Index, reclength, WriteFileNumber = 19;
register double *TempPtr, *OutputPtr;
static    int    X, M, Rec ength;
```

```c
static  double  *TempVector;
static  int     Chains [MAXSIZE], ncodes, LineStart, ColStart;
static  int     NormEndLine, NormEndCol, Xdim, Ydim, XNormdim, YNormdim;
static  float   perimeter, xbar, ybar;

TempVector = (double *) malloc (sizeof (double) * 100);

PreviousChar = SPACE;

printf ("*** %d *** characters in this line (checking for noise) \n",WordCounter);
    TextLineCounter++;
    for (I = 0; I < WordCounter; I++)
    {
        for (J = 0; J < Word[I].CharacterCount; J++)
        {
            /* Check for noise */
            if (Word[I].CharacterData[J].Height >
                (0.3 *
(Text.EndLine-Text.StartLine)))
            {
                ScaleAndBuildInputData (LineBufPtr, \
Word[I].CharacterData[J].StartLine, Word[I].CharacterData[J].EndLine, Word[I].CharacterData[J].StartCol, Word[I].CharacterData[J].EndCol);
```

```
                    for (X = 0; X < NUMSCALEDIMAGEBITS;
X++)
                    {
                        if (InputUnit[X] == 1.0)
                            fprintf (fp,"1 ");
                        else fprintf (fp,"0 ");
                    } if (SaveOrigFlag == TRUE)
                    {
                        RecLength = 8;
                        sprintf (filename, "%d",
ObjectCounter);
                        OpenWriteFile (&WriteFileNumber,
filename, &RecLength);
                        for (M =
Word[I].CharacterData[J].StartLine;
                                M <
Word[I].CharacterData[J].EndLine;
                                M++)
                        {
                            PutSeqLine (
&LineBufPtr[M][Word[I].CharacterData[J].StartCol],
                                    RecLength,
WriteFileNumber );
                        }
                        CloseFile (&WriteFileNumber);
                    }

/* Because machine can be small in size, the
character is normalized to
            32X32 prior to feature extraction. The
normalized character is stored in SecondLir ufPtr */
```

```
                        Norm_Orig_With_Beato_Scaler (

LineBufPtr,

SecondLineBufPtr,

Word[I].CharacterData[J].StartLine,

Word[I].CharacterData[J].EndLine,

Word[I].CharacterData[J].StartCol,

Word[I].CharacterData[J].EndCol);

NormEndLine=NORM_HORIZONTAL_RESOLUTION+4;
                        NormEndCol
=NORM_VERTICAL_RESOLUTION+4;

if (SaveNormFlag == TRUE)
                    {                               \
                        RecLength = 8;
                        sprintf (filename, "%d",
ObjectCounter);
                        OpenWriteFile (&WriteFileNumber,
filename, &RecLength);
                        for (M = 0;
                          M < NormEndLine;
                          M++)
                        {
                          PutSeqLine ( &SecondLineBufPtr[M][0],
                                        RecLength,
WriteFileNumber );
```

```
                }
                CloseFile (&WriteFileNumber);
        }

ExtractGenOrigBitmapFeaturesV2(
SecondLineBufPtr,
                                0,
                                0,
                                NormEndLine,
                                NormEndCol,
                                TempVector,
                                &numfeatures);

for (X =0; X < numfeatures; X++)
                {
                        if (TempVector[X] == 1.0) fprintf
(fp, "1 ");
                        else if (TempVector[X] == 0.5)
fprintf (fp, ".5 ");
                        else fprintf (fp, "0 ");
                }

/* Thin the character using L. Tan's
thinning algorithm  */

Get_Stroke_WidthVer2 (
SecondLineBufPtr,
                                0,
                                0,
                                NormEndLine,
                                NormEndCol,
                                &stroke_width);

Thin_TanVer2 ( SecondLineBufPtr,
```

```
                    0,
                    0,
                    NormEndLine,
                    NormEndCol,
                    ThinBufPtr,
                    stroke_width);

if (SaveNormThinFlag == TRUE)
        {
            RecLength = 8;
            sprintf (filename, "%d",
ObjectCounter);
            OpenWriteFile (&WriteFileNumber,
filename, &RecLength);
            for (M = 0;
              M < NormEndLine;
              M++)
            {
              PutSeqLine ( &ThinBufPtr[M][0],
                        RecLength,
WriteFileNumber );
            }
            CloseFile (&WriteFileNumber);
        }

ExtractTemplateFeaturesVer2 (
ThinBufPtr,
                                0,
                                0,
                                NormEndLine,
                                NormEndCol,
                                ObjectCounter,
                                TempVector
```

```
                    &numfeatures);

for (X =0; X < numfeatures; X++)
        {
            if (TempVector[X] == 1.0) fprintf
(fp, "1 ");
            else if (TempVector[X] == 0.5)
fprintf (fp, ".5 ");
            else fprintf (fp, "0 ");
        }

ExtractCurvatureFeatures (
ThinBufPtr,
                    0,
                    0,
                    NormEndLine,
                    NormEndCol,
                    ObjectCounter,
                    TempVector,
                    &numfeatures);

for (X =0; X < numfeatures; X++)
        {
            if (TempVector[X] == 1.0) fprintf
(fp, "1 ");
            else if (TempVector[X] == 0.5)
fprintf (fp, ".5 ");
            else fprintf (fp, "0 ");
        } fseek (fp, -1, 1);
        fprintf (fp,"\n");
        WriteTargetString (ObjectCounter++);
        if (ObjectCounter%50 == 0)
```

```c
                printf ("Writing object %4d\n",ObjectCounter);
            }
            else
            {
                printf ("Disregard object %d in this line\n",I);
            }
        }
    }
}

/***************************************************/
DumpData()
{
int   I, J;

printf ("Line number - %d\n",LineCounter++);

if (WordCounter != 10)
        printf ("<<<<<<<<< %d words >>>>>>>>>\n",WordCounter);
    else printf ("  %d words\n",WordCounter);
    printf ("  Text.StartLine - %d  Text.EndLine - %d \n",
        Text.StartLine, Text.EndLine);
    for (I = 0; I < WordCounter; I++)
    {
        printf ("    %d characters in word %d\n",Word[I].CharacterCount,I);
        for (J = 0; J < Word[I].CharacterCount; J++)
        {
            printf("        Height - %d  Width - %d\n",
                Word[I].CharacterData[J].Height,
```

```
                    Word[I].CharacterData[J].Width);

}
        }

}
    /*****************************************************/
    int  OutputXlate_Uppercase [26] =
        {

0,2,4,5,7,9,11,13,15,17,19,21,23,25,27,28,29,31,33,34,36,
    37,38,39,40,42
        };
    int  OutputXlate_Lowercase [26] =
        {

1,3,4,6,8,10,12,14,16,18,20,22,24,26,27,28,30,32,33,35,36
    ,37,38,39,41,42
        };
    int  OutputXlate_Digits [10] =
        {
        22,43,44,45,46,47,48,49,50,27
        };
    BOOLEAN    *TempArray[100];
    char Type[10];
    int  NumberOfOutputs;
    int  AverageHeight = 0, RunningSum = 0,
    AverageHeightCounter = 0;
    #define    WHITE_SPACE_SIZE     0
    /*****************************************************
    /
```

```c
BuilderSupport(Header)
char *Header;
{
int   RecLength, ReadFileNumber, StartingLineNumber,
StartingColumnNumber;
int   ScaleFactor;
int   NumberOfLines;
static BYTE     PackedLineBuf[1024];
static BOOLEAN ScaledLine[5000];
register int   StartX;
register BYTE  Pixel;
register int   Line;
register int   Column, LastCol, ActualLastCol;
register int   X, Y, EndLine;
int   NumOfObjects;
char *filename="machine_wfeat.DATA";
char Ans[10];
int  I;

printf ("Do you want the header ? -> ");
    scanf ("%s", Header);

printf ("\nEnter the training data type U, L, D, S
-> ");
    scanf ("%s", Type);
    printf ("\n");

if (toupper(Type[0]) == 'U')
    {
        NumberOfOutputs = 51;
        NumberOfObjects = 26 * NumberOfReps;
    }
```

```c
    else if (toupper(Type[0]) == 'L')
    {
        NumberOfOutputs = 51;
        NumberOfObjects = 26 * NumberOfReps;
    }
    else if (toupper(Type[0]) == 'D')
    {
        NumberOfOutputs = 51;
        NumberOfObjects = 10 * NumberOfReps;
    }
    else
    {
        NumberOfOutputs = 51;
        NumberOfObjects = 26 * NumberOfReps;
    }

/* Check to see if the header needs to be printed */
    if ( (Header[0] == 'y') || (Header[0] == 'Y'))
    { printf ("Do you want to override the DEPTH field ? ->");
        scanf ("%s",Ans);
        printf ("\n");
        if ( (Ans[0] == 'y') || (Ans[0] == 'Y'))
        {
            printf ("Input the depth -> ");
            scanf ("%d",&NumberOfObjects);
            printf ("\n");
        }
        fprintf (fp,"%d #inputs\n",
(HORIZONTAL_RESOLUTION *
                            VERTICAL_RESOLUTION +
NUMFEATUREBITS));
```

```c
        fprintf (fp,"%d #outputs\n",NumberOfOutputs);

fprintf (fp,"%d #layers\n",3);
        fprintf (fp,"%d #characters\n",NumberOfObjects);
    }

}
/***********************************************************/
WriteTargetString (ObjectCounter)
int   ObjectCounter;
{
int  I, Index;

if (toupper(Type[0]) == 'U')
    {
        Index = OutputXlate_Uppercase
            [(ObjectCounter % NumberOfObjects) / NumberOfReps];

}
    else if (toupper(Type[0]) == 'L')
    {
        Index = OutputXlate_Lowercase
            [(ObjectCounter % NumberOfObjects) / NumberOfReps];

}
    else if (toupper(Type[0]) == 'D')
    {
        Index = OutputXlate_Digits
            [(ObjectCounter % NumberOfObjects) / NumberOfReps];
    }
    else
```

```c
        {
            Index = OutputXlate_Uppercase
                [(ObjectCounter % NumberOfObjects) /
NumberOfReps];
        } for (I = 0; I < Index; I++)
            fprintf (fp,".05 ");

fprintf (fp, ".99 ");

for (I = Index+1; I < NumberOfOutputs; I++)
            fprintf (fp,".05 ");

fseek(fp,-1,1);   /* Go back 1 space before inserting
CR/LF */
        fprintf(fp,"\n");
    }

/*******************************************/
GetCharacters( LineBufPtr,
            StartLine,
            EndLine,
            LineWidth,
            WordSpacing,
            LastPixelColumn)
BOOLEAN    LineBufPtr[300][4000];
int   StartLine, EndLine, LineWidth, LastPixelColumn;
int   WordSpacing;
{
int   I, PreviousCol;
int   StartCol, EndCol;
static    int CharacterStartLine, CharacterEndLine;
char OutputChar;
int   Index;
```

```
int   PrevEndLine;
int   StartI;

I = 0;
      WordCounter = 0;
      EndCol = NULL;

CharacterCount = 0;

Text.StartLine = StartLine;
      Text.EndLine   = EndLine;

Word[WordCounter].TopLine =
Word[WordCounter].BaseLine = 0;
      do

{
            StartI = I;
            /* Look for the start of the first character */
            do {} while (   (Vert_Histogram[I++] == 0) &&
                    (I < LastPixelColumn));

if ((I - StartI) < WHITE_SPACE_SIZE)
            {
                  /* Go back to previous word */
                  WordCounter--;
                  goto JumpOverWhiteSpace;
            }
            if (I < LastPixelColumn)
            {
                  StartCol = I-1;

/* We are done a new word so start a new
one */
```

```
                if (     ((StartCol - EndCol) >
WordSpacing) &&
                    (EndCol != NULL))
                {
                    Word[WordCounter].BaseLine =
Word[WordCounter].BaseLine/
                                CharacterCount;
                    Word[WordCounter].TopLine =
Word[WordCounter].TopLine/
                                CharacterCount;
                    Word[WordCounter].CharacterCount =
CharacterCount;
                    CharacterCount = 0;
                    WordCounter++;
Word[WordCounter].CharacterData[CharacterCount].EndCol
= EndCol;

Word[WordCounter].CharacterData[CharacterCount].Height
= CharacterEndLine - CharacterStartLine+1;

Word[WordCounter].CharacterData[CharacterCount].Width
= EndCol - StartCol + 1;

Word[WordCounter].BaseLine +=
CharacterEndLine;

Word[WordCounter].TopLine +=
CharacterStartLine;

CharacterCount++;
            /* Found next character */
            I++;
        }
```

```
        } while (I <= LastPixelColumn);

/* We are done a new word so start a new one */
        if ( EndCol != NULL)
        {
            Word[WordCounter].BaseLine =
Word[WordCounter].BaseLine/
                    CharacterCount;
            Word[WordCounter].TopLine =
Word[WordCounter].TopLine/
                    CharacterCount;
            Word[WordCounter].CharacterCount =
                Word[WordCounter].BaseLine = 0;
                Word[WordCounter].TopLine  = 0;
        }

JumpOverWhiteSpace:
            do {} while (   (Vert_Histogram[I++] > 0)
&&
                    (I < LastPixelColumn));

if (I == LastPixelColumn)
                EndCol = I;
            else EndCol = I-2;

GetCharLineNumbers (    LineBufPtr,
                    StartCol,
                    EndCol,
                    StartLine,
                    EndLine,
                    &CharacterStartLine,
                    &CharacterEndLine);
```

```
Word[WordCounter].CharacterData[CharacterCount].StartLine
= CharacterStartLine;

Word[WordCounter].CharacterData[CharacterCount].EndLine
= CharacterEndLine;

Word[WordCounter].CharacterData[CharacterCount].StartCol
= StartCol;
CharacterCount;
            CharacterCount = 0;
            WordCounter++;
        }
    }
/*******************************************/
DoVerticalHistogram (   LineBufPtr,
                StartRow,
                EndRow,
                LineWidth,
                LastPixelColumn)
BOOLEAN    LineBufPtr[300][4000];
int   StartRow, EndRow, LineWidth, *LastPixelColumn;
        }
    }

/* Keep track of the last Column with pixels */
if (Vert_Histogram[X] > 0)
      *LastPixelColumn = J;
X++;
 {
 int   I, J, X;
 char filename[80]="Vert_hist.out";

X = 0;
        for (J = 0; J < LineWidth; J++)
```

```
{
    Vert_Histogram[X] = 0;
    for (I = StartRow; I <= EndRow; I++)
    {
        if (LineBufPtr[I][J] != 0)
        {
            Vert_Histogram[X] = Vert_Histogram[X]

/*********************************/
DoHorizontalHistogram ( State,
              LineBuffer,
              LineWidth,
              TrainFlag)
int   *State;
int   LineWidth;
BOOLEAN   LineBuffer[], TrainFlag;

{
/* NOTE: I must be a static variable since we want to
keep the value intact
     after we leave the procedure */
static   int I, J, NextState;
register BOOLEAN *BufPtr = LineBuffer;

Horiz_Histogram[I] = 0;

/* Scan the line and look for pixels */
    for (J = 0; J < LineWidth; J++)
    {
        if (*BufPtr++ != 0)
            Horiz_Histogram[I] = Horiz_Histogram[I] +
1;
    }
```

```c
*State = IDLE;

if (TrainFlag == TRUE)
{
        /* Check to see if we are starting the
beginning of a text line */
        if ((Horiz_Histogram[I] > 0) && (I == 0))
        {
            *State = START_OF_TEXT_LINE;
            I++;
        }
        else if ((Horiz_Histogram[I] > 0) && (I > 0))
        {
            *State = MIDDLE_OF_TEXT_LINE;
            I++;
        } else if ((Horiz_Histogram[I] == 0)  &&
           (I > 0))
        {
            if ((  I < (AverageHeight * 0.85)) &&
               (toupper(Type[0]) == 'L'))
            {
                *State = MIDDLE_OF_TEXT_LINE;
                I++;
            }
            else
            {
                *State = END_OF_TEXT_LINE;
                RunningSum += I+1;
                AverageHeightCounter++;
                AverageHeight =
RunningSum/AverageHeightCounter;
                I = 0;
```

```
                }
            }
        }
        else    /* We are not training */
        {

/* Check to see if we are starting the
    beginning of a text line */
            if ((Horiz_Histogram[I] > 0) && (I == 0))
            {
                *State = START_OF_TEXT_LINE;
                I++;
            }
            else if ((Horiz_Histogram[I] > 0) && (I > 0))
            {
                *State = MIDDLE_OF_TEXT_LINE;
                I++;
            }
            else if ((Horiz_Histogram[I] == 0)   &&
                     (Horiz_Histogram[I-1] > 0) &&
                     (I > 0))
            {
                *State = END_OF_TEXT_LINE;
                I = 0;
            }
        }
    }
/*****************************************/
GetCharLineNumbers (     LineBufPtr,
            StartCol,
            EndCol,
            StartLine,
            EndLine,
            CharacterStartLine,
            CharacterEndLine)
```

```
BOOLEAN    LineBufPtr[300][4000];
int   StartCol,
      EndCol,
      StartLine,
      EndLine,
      *CharacterStartLine,
      *CharacterEndLine;
{
register BOOLEAN *BufPtr;
int   I, J;
BOOLEAN   Pixels;

/************ Locate the upper portion of the
character *******/
    J = 0;

I = StartLine;
    Pixels = FALSE;
    do
    {
        J = StartCol;
        BufPtr = &LineBufPtr[I][J];
        /* Scan the line and look for pixels */
        do
        {
            if (*BufPtr++ != 0)
                Pixels = TRUE;
            J++;
        } while (J <= EndCol);

I++;
    } while ((I <= EndLine) && (Pixels == FALSE));
```

```c
        *CharacterStartLine = I - 1;

/*********** Locate the lower portion of the
character *******/
    I = EndLine;
    Pixels = FALSE;
    do
    {
        J = StartCol;
        BufPtr = &LineBufPtr[I][J];
        /* Scan the line and look for pixels */
        do
        {
            if (*BufPtr++ != 0)
                Pixels = TRUE;
            J++;
        } while (J <= EndCol);

I--;
    } while ((I >= StartLine) && (Pixels == FALSE));

*CharacterEndLine = I + 1;
}

/*******************************************************
*******************
*
*   Procedure: ScaleAndBuildInputData
*
*   Author: Louis J. Beato
*   Date:     09/27/88
```

```
 *
 *      Modification History:
 *
 *      Purpose:
 *
 *      Calling Sequence:
 *
 *      Operational Details:
 *
 ***********************************************************
 *******************/
BOOLEAN CheckOrigNeighbors ();
ScaleAndBuildInputData (LineBufPtr,
            StartLine,
            EndLine,
            StartCol,
            EndCol)
BOOLEAN    LineBufPtr[300][4000];
int   StartLine, EndLine, StartCol, EndCol;
{
int   Height, Width, I, J;
double    InputI, InputJ;
double    *InputBufPtr;
double    RowRadius, ColRadius;

InputBufPtr = InputUnit;
    Height = EndLine - StartLine + 1;
    Width  = EndCol  - StartCol  + 1;

RowRadius =
 ((double)Height/(double)HORIZONTAL_RESOLUTION);
    ColRadius =
 ((double)Width/(double)VERTICAL_RESOLUTION);
```

```
/* Step thru the 24 x 12 output array */
for (I = 0; I < HORIZONTAL_RESOLUTION; I++)
{
    for (J = 0; J < VERTICAL_RESOLUTION; J++)
    {
        InputI = StartLine + (I * RowRadius);
        InputJ = StartCol  + (J * ColRadius);
        if (CheckOrigNeighbors (LineBufPtr,
                    InputI,
                    InputJ,
                    RowRadius,
                    ColRadius,
                    StartLine,
                    StartCol,
                    EndLine,
                    EndCol) == TRUE)
            *InputBufPtr++ = 1.0;
        else *InputBufPtr++ = 0.0;
    }
}
```

```
/*******************************************************
 *
 *   Procedure: CheckNeighbors
 *
 *   Author: Louis J. Beato
 *   Date:     07/25/88
 *
 *   Modification History:
 *
 *   Purpose:
 *
 *   Calling Sequence:
```

```
 *
 *     Operational Details:
 *
 ***********************************************************************/
BOOLEAN CheckOrigNeighbors (LineBufPtr,
                InputI,
                InputJ,
                RowRadius,
                ColRadius,
                FirstLine,
                FirstColumn,
                LastLine,
                LastColumn)
BOOLEAN    LineBufPtr[300][4000];
double     InputI, InputJ, RowRadius, ColRadius;
int  FirstLine, FirstColumn, LastLine, LastColumn;
{
int  I, J, StartRow, StartCol, EndRow, EndCol;
BOOLEAN    Pixel;
int  PixelCount;

/*   printf ("InputI %f InputJ %f RowRadius %f ColRadius
%f\n",
            InputI,
            InputJ,
            RowRadius,
            ColRadius);*/

/* Add 0.5 to allow round up */
    StartRow = (int)(InputI - RowRadius/2 + 0.5);
    if (StartRow < FirstLine)
        StartRow = FirstLine;
```

```
StartCol = (int)(InputJ - ColRadius/2 + 0.5);
if (StartCol < FirstColumn)
     StartCol = FirstColumn;

EndRow   = (int)(InputI + RowRadius/2);
if (EndRow > LastLine)
     EndRow = LastLine;

EndCol   = (int)(InputJ + ColRadius/2);
if (EndCol > LastColumn)
        EndCol = LastColumn;

Pixel = FALSE;
     I = StartRow;
     do
     {
          J = StartCol;
          do
          {
               if (LineBufPtr[I][J] != 0)
                    Pixel = TRUE;
               J++;
          } while ((Pixel == FALSE) && (J <= EndCol));

I++;
     } while ((Pixel == FALSE) && (I <= EndRow));

return (Pixel);
}

/************* ******************************************
```

```
/*********************
*
*    Procedure: CheckThinNeighbors
*
*    Author: Louis J. Beato
*    Date:       07/25/88
*
*    Modification History:
*
*    Purpose:
*
*    Calling Sequence:
*
*    Operational Details:
*
***********************************************************
*******************/
BOOLEAN CheckThinNeighbors (ThinBufPtr,
                InputI,
                InputJ,
                RowRadius,
                ColRadius,
                FirstLine,
                FirstColumn,
                LastLine,
                LastColumn)
BOOLEAN
ThinBufPtr[STANDARDCHARHEIGHT][STANDARDCHARWIDTH];
double    InputI, InputJ, RowRadius, ColRadius;
int   FirstLine, FirstColumn, LastLine, LastColumn;
{
int  I, J, StartRow, StartCol, EndRow, EndCol;
BOOLEAN    Pixel;
int  PixelCount;
```

```
/*      printf ("InputI %f InputJ %f RowRadius %f ColRadius
%f\n",
        InputI,
        InputJ,
        RowRadius,
        ColRadius);*/

/* Add 0.5 to allow round up */
    StartRow = (int)(InputI - RowRadius/2 + 0.5);
    if (StartRow < FirstLine)
        StartRow = FirstLine;

StartCol = (int)(InputJ - ColRadius/2 + 0.5);
    if (StartCol < FirstColumn)
        StartCol = FirstColumn;

EndRow  = (int)(InputI + RowRadius/2);
    if (EndRow > LastLine)
        EndRow = LastLine;

EndCol  = (int)(InputJ + ColRadius/2);
    if (EndCol > LastColumn)
        EndCol = LastColumn;

Pixel = FALSE;
    I = StartRow;
    do
    {
        J = StartCol;
        do
        {
            if (ThinBufPtr[I][J] != 0)
                Pixel = TRUE;
```

```
            J++;
        } while ((Pixel == FALSE) && (J <= EndCol));
        I++;
    } while ((Pixel == FALSE) && (I <= EndRow));

return (Pixel);
}

/*******************************************************
**********
    This prog thins an image file similar to the algorithm
described
    in Rosenfeld & Kak (page 232).
    Input image is binary and assumed bit_reversed
********************************************************
**********/ define CHAR_VAL      255      /* pixel value for a character */
define NON_CHAR_VAL  0        /* non-char pixel value */
#define MSIZE         100      /* max # of rows of pixels */
#define NSIZE         100      /* max # of columns of pixels */
#define MAX_LIST      40000    /* max # of pixels that can be deleted in
                                  any scan direction */

BOOLEAN mask[3][3];
long int del_list[MAX_LIST][2];
int max_m, max_n;
Thin_TanVer2( SecondLineBufPtr,
        startline,
```

```
                    startcol,
                    endline,
                    endcol,
                    ThinBufPtr,
                    stroke_width)

BOOLEAN
SecondLineBufPtr[NORM_HORIZONTAL_RESOLUTION+4][NORM_VERTI
CAL_RESOLUTION+4];
BOOLEAN
ThinBufPtr[STANDARDCHARWIDTH][STANDARDCHARHEIGHT];
int  startline, startcol, endline, endcol, stroke_width;
{
  long int pixels_removed, sum;
  int  i,j, w;
  long int scrape();
  int     width, height;
  register int fasti, fastj;

width = endcol - startcol;
  height = endline - startline;

for (fasti = 0; fasti < MSIZE; fasti++)
    for (fastj = 0; fastj < NSIZE; fastj++)
      ThinBufPtr[fasti][fastj] = NON_CHAR_VAL;

for (i = 2; i < height-2; i++)
  {
    for (j = 2; j < width-2; j++)
    {
      ThinBufPtr[i][j] =
SecondLineBufPtr[startline+i-2][startcol+j-2];
    }
  }
```

```c
  init_list();
  init_im(ThinBufPtr, height, width);

i = w = 0;

/* Repeat till no more pixels are deleted */
  do{
    sum = 0;
    ++i;

if ( w < stroke_width ){
        /* for the first few iterations, allow "tail-end
pixels" to
        be deleted */ eastwards(ThinBufPtr, height, width, 1);
        pixels_removed = scrape(ThinBufPtr);
        sum += pixels_removed;
/*      printf("\n[%d] eastwards %ld removed",i,
pixels_removed); */ southwards(ThinBufPtr, height, width, 1);
        pixels_removed = scrape(ThinBufPtr);
        sum += pixels_removed;
/*      printf("\n[%d] southwards %ld removed",i,
pixels_removed); */
    ++w;
    }
    else {
      /* disallow the removal of "tail-end pixels" */
        eastwards(ThinBufPtr, height, width, 0);
        pixels_removed = scrape(ThinBufPtr);
        sum += pixels_removed;
/*      printf("\n[%d] eastwards %ld removed",i,
pixels_removed); */
```

```
            southwards(ThinBufPtr, height, width, 0);
            pixels_removed = scrape(ThinBufPtr);
            sum += pixels_removed;
/*          printf("\n[%d] southwards %ld removed",i,
pixels_removed); */
       ++w;
     } if ( w < stroke_width ){
          /* for the first few iterations, allow "tail-end
pixels" to
          be deleted */
            westwards(ThinBufPtr, height, width, 1);
            pixels_removed = scrape(ThinBufPtr);
            sum += pixels_removed;
/*          printf("\n[%d] westwards %ld  removed",i,
pixels_removed); */ northwards(ThinBufPtr, height, width, 1);
            pixels_removed = scrape(ThinBufPtr);
            sum += pixels_removed;
/*          printf("\n[%d] northwards %ld removed",i, pixels_removed); */
     }
     else {
       /* disallow the removal of "tail-end pixels" */
            westwards(ThinBufPtr, height, width, 0);
            pixels_removed = scrape(ThinBufPtr);
            sum += pixels_removed;
/*          printf("\n[%d] westwards %ld  removed",i,
pixels_removed); */ northwards(ThinBufPtr, height, width, 0);
            pixels_removed = scrape(ThinBufPtr);
```

```
        sum += pixels_removed;
/*      printf("\n[%d] northwards %ld removed",i,
pixels_removed); */
    }
  }
  while( sum != 0);

} init_list()
{
  long int i;

for (i=0; i < MAX_LIST; ++i)
    del_list[i][0] = MSIZE;
} init_im( ThinBufPtr,max_m, max_n)
BOOLEAN
ThinBufPtr[STANDARDCHARHEIGHT][STANDARDCHARWIDTH];
int max_m, max_n;
/* place a border of non-character pixels around image */
{
  int i,j;

for (i=0; i<max_m; ++i)
    for(j=0; j<max_n; ++j)
      if( i==0 || i==max_m-1 || j==0 || j==max_n-1)
        ThinBufPtr[i][j] == NON_CHAR_VAL;
} long int scrape(ThinBufPtr)
BOOLEAN
ThinBufPtr[STANDARDCHARHEIGHT][STANDARDCHARWIDTH];
```

```
{
  int i, j;
  long int count;

if( del_list[MAX_LIST - 1][0] != MSIZE){
     printf("\nerror : max number of delete nodes exceeded");
     exit(0);
  }
  count = 0;
  while ( del_list[count][0] != MSIZE){
     ThinBufPtr [ del_list[count][0] ][ del_list[count][1] ] = NON_CHAR_VAL;
     del_list[count][0] = MSIZE;
     ++count;
  } return(count);
} eastwards(ThinBufPtr, max_m, max_n,delete_tail)
BOOLEAN
ThinBufPtr[STANDARDCHARHEIGHT][STANDARDCHARWIDTH];
int max_m, max_n, delete_tail;
/*************************************************
    perform thinning operation in the east direction.
    note: tail-end pixels are allowed to be deleted when the
          variable delete_tail is set equal to 1.
*************************************************/
{
  int i,j, num, neighbors;
```

```
  long int count;

count = 0;
  for (i=0; i < max_m; ++i)
    for(j = 0 ; j < max_n; ++j){ if( ThinBufPtr[i][j]==CHAR_VAL &&
ThinBufPtr[i][j-1] != CHAR_VAL){
        num = num_component(ThinBufPtr,i,j,&neighbors);
        if( delete_tail == 1 ){
          if( num <= 1){
            del_list[count][0] = i;
            del_list[count][1] = j;
            ++count;
          }
        } else{
          if( num <= 1 && neighbors != 1){
            del_list[count][0] = i;
            del_list[count][1] = j;
            ++count;
          }
        }
      }
    }
} westwards(ThinBufPtr, max_m, max_n, delete_tail)
BOOLEAN
ThinBufPtr[STANDARDCHARHEIGHT][STANDARDCHARWIDTH];
int max_m, max_n, delete_tail;
{
  int i,j, num, neighbors;
  long int count;
```

```
      count = 0;
      for (i=0; i < max_m; ++i)
        for(j = max_n - 1 ; j >= 0; --j){ if( ThinBufPtr[i][j]==CHAR_VAL &&
ThinBufPtr[i][j+1] != CHAR_VAL){
             num = num_component(ThinBufPtr,i,j,&neighbors);
             if( delete_tail == 1 ){
                if( num <= 1){
                  del_list[count][0] = i;
                  del_list[count][1] = j;
                  ++count;
                }

}
             else{
                if( num <= 1 && neighbors != 1){
                  del_list[count][0] = i;
                  del_list[count][1] = j;
                  ++count;
                }
             }
          }
        }
} southwards(ThinBufPtr, max_m, max_n, delete_tail)
BOOLEAN
ThinBufPtr[STANDARDCHARHEIGHT][STANDARDCHARWIDTH];
int max_m, max_n, delete_tail;
{
   int i,j, num, neighbors;
   long int count;

count = 0;
```

```
    for(j = 0 ; j < max_n; ++j)
      for (i=0; i < max_m ; ++i){ if( ThinBufPtr[i][j]==CHAR_VAL &&
ThinBufPtr[i-1][j] != CHAR_VAL){
            num = num_component(ThinBufPtr,i,j,&neighbors);
            if( delete_tail == 1 ){
              if( num <= 1){
                 del_list[count][0] = i;
                 del_list[count][1] = j;
                 ++count;

}
            }
            else{
              if( num <= 1 && neighbors != 1){
                 del_list[count][0] = i;
                 del_list[count][1] = j;
                 ++count;

}
            }
         }
      }
} northwards(ThinBufPtr, max_m, max_n, delete_tail)
BOOLEAN
ThinBufPtr[STANDARDCHARHEIGHT][STANDARDCHARWIDTH];
int max_m, max_n, delete_tail;
{
  int i,j, num, neighbors;
  long int count;

count = 0;
  for(j = 0 ; j < max_n; ++j)
```

```c
        for (i=max_m-1; i >=0 ; --i){ if( ThinBufPtr[i][j]==CHAR_VAL &&
ThinBufPtr[i+1][j] != CHAR_VAL){
                num = num_component(ThinBufPtr,i,j,&neighbors);
                if( delete_tail == 1 ){
                   if( num <= 1){
                     del_list[count][0] = i;
                     del_list[count][1] = j;
                     ++count;
                   }
                }
                else{
                   if( num <= 1 && neighbors != 1){
                     del_list[count][0] = i;
                     del_list[count][1] = j;
                     ++count;
                   }
                }
             }
          }
       }
} num_component(ThinBufPtr,m,n,p_neighbors)
BOOLEAN
ThinBufPtr[STANDARDCHARHEIGHT][STANDARDCHARWIDTH];
int m,n, *p_neighbors;
{
   int i,j,label,past_label,k;

ThinBufPtr[m][n] = NON_CHAR_VAL;

label = *p_neighbors = 0;
   for ( i=0; i<3; ++i)
      for( j=0; j<3; ++j){
```

```
        if( ThinBufPtr[ m+i-1][n+j-1] != CHAR_VAL)
          mask[i][j] = 0;
        else{
          ++(*p_neighbors);
          past_label = check_neigh(i,j,&label);

if( past_label == 0 )
            mask[i][j] = ++label;
          else
            mask[i][j] = past_label;
        }
      }
   ThinBufPtr[m][n] = CHAR_VAL;

return(label);
} check_neigh(i,j,p_label)
int i,j,*p_label;
{
   int ref, max;

ref = i*3 +j;

switch(ref){ case 0: return(0);

case 1: return( mask[0][0] );

case 2: return (mask[0][1] );

case 3: max = ( mask[0][1] >=  mask[0][0] )?
mask[0][1] : mask[0][0];
             return(max);
```

```
case 4: /* don't care; never occurs */
        printf("\nerror: case 4");
        exit(0);

case 5: max = ( mask[0][2] >= mask[0][1] )?
              mask[0][2] : mask[0][1];
        return ( max );

case 6: return( mask[1][0] );

case 7: max = ( mask[2][0] >= mask[1][0] )?
              mask[2][0] : mask[1][0];
        if( max == mask[1][2] )
           return( max );
        else if ( max == 0 )
           return( mask[1][2] );
        else if ( mask[1][2] == 0 )
           return( max );
        else
           return( --(*p_label) );

case 8: max = ( mask[2][1] >= mask[1][2] )?
              mask[2][1] : mask[1][2];
        return (max);

}
}

/*************************************************************
****************/
#define   MAXINTERCEPTS 20
Get_Stroke_WidthVer2 (   SecondLineBufPtr,
              sline,
              scol,
              endline,
```

```
                endcol,
                  widthptr)
BOOLEAN
SecondLineBufPtr[NORM_HORIZONTAL_RESOLUTION+4][NORM_VERTICAL_RESOLUTION+4];
int  sline, scol, endline, endcol, *widthptr;
{
int  width[MAXINTERCEPTS];
int  cnt, i, j, windex, Y,X;
BOOLEAN   done;

done = FALSE;
    cnt = windex = 0;
    for (i=0; i<MAXINTERCEPTS;i++) width[i]=0;
    i = scol;
    j = sline;
    Y = (int) ( (float)( ( (endline - sline)*0.3) + sline) );
    X = (int) ( (float)( ( (endcol - scol)*0.5) + scol) );

while ( i < endcol && windex < MAXINTERCEPTS)
    {
        if ( SecondLineBufPtr[ Y ][i] == 0 &&
          SecondLineBufPtr[ Y ][i+1] != 0 )
     {
      i++;
      cnt++;
      while (SecondLineBufPtr[Y][i++] != 0) cnt++;
      width[windex++] = cnt;
      cnt = 0;
     }
     else
       i++;
```

```
    } while ( j < endline && windex < MAXINTERCEPTS)
    {
        if ( SecondLineBufPtr[ j ][X] == 0 &&
          SecondLineBufPtr[ j+1 ][X] != 0 )
        {
         j++;
         cnt++;
         while (SecondLineBufPtr[j++][X] != 0) cnt++;
         width[windex++] = cnt;
         cnt = 0;
        }
        else
          j++;
    }

/* The minimum width value in the array width is
returned */
    *widthptr = 10000;
    for (i = 0; i < windex; i++)
    {
     if (width[i] < *widthptr) *widthptr =  width[i];
    }
    if (*widthptr > 15) *widthptr = 7;
    else
      *widthptr = (int) (0.5 * *widthptr);
}
/*************************************************
***************/
ExtractGenOrigBitmapFeaturesV2 (SecondLineBufPtr,
              Line,
              Col,
```

```
                        EndLine,
                        EndCol,
                        TempArray,
                        numfeatures)
BOOLEAN
SecondLineBufPtr[NORM_HORIZONTAL_RESOLUTION+4][NORM_VERTI
CAL_RESOLUTION+4];
double      *TempArray;
int         *numfeatures;
int         Line, Col, EndLine, EndCol;
{
static int      BoundaryFeatures[16][7][7] = {
                { 0,  0,  0,  0,  0,  0,  0,
                  0,  0,  0,  1, -4, -4,  0,
                  0,  0,  1,  1,  0, -4,  0,   /* Boundary
Edge Rt */
                  0,  0,  1,  1, -4, -4,  0,
                  0,  0,  1,  1,  0, -4,  0,
                  0,  0,  0,  1, -4, -4,  0,
                  0,  0,  0,  0,  0,  0,  0  }, { 0,  0,  0,  0,  0,  0,  0,
                  0, -4, -4,  1,  0,  0,  0,
                  0, -4,  0,  1,  1,  0,  0,
                  0, -4, -4,  1,  1,  0,  0,   /* Boundary
Edge Lft */
                  0, -4,  0,  1,  1,  0,  0,
                  0, -4, -4,  1,  0,  0,  0,
                  0,  0,  0,  0,  0,  0,  0  }, { 0,  0,  0,  0,  0,  0,  0,
                  0, -4, -4, -4, -4, -4,  0,
                  0, -4,  0, -4,  0, -4,  0,
                  0,  1,  1,  1,  1,  1,  1,   /* Boundary
```

```
                                                                /* Boundary
Edge up */
            0,   0,   1,   1,   1,   0,   0,
            0,   0,   0,   0,   0,   0,   0,
            0,   0,   0,   0,   0,   0,   0    }, { 0,   0,   0,   0,   0,   0,   0,
            0,   0,   0,   0,   0,   0,   0,
            0,   0,   1,   1,   1,   0,   0,   /* Boundary
Edge Down */
            0,   1,   1,   1,   1,   1,   0,
            0,  -4,   0,  -4,   0,  -4,   0,
            0,  -4,  -4,  -4,  -4,  -4,   0,
            0,   0,   0,   0,   0,   0,   0    }, { 0,   0,   0,  -4,  -4,   0,   0,
            0,   0,  -4,   0,   0,   1,   0,
            0,  -4,  -4,   0,   1,   1,   0,
           -4,   0,   0,   1,   1,   0,   0,   /* Boundary
Edge */
           -4,   0,   1,   1,   0,   0,   0,   /* Main Diag
up   */
            0,   1,   1,   0,   0,   0,   0,
            0,   0,   0,   0,   0,   0,   0    }, { 0,   0,   0,   0,   0,   0,   0,
            0,   0,   0,   0,   1,   1,   0,
            0,   0,   0,   1,   1,   0,  -4,   /* Boundary
Edge */
            0,   0,   1,   1,   0,   0,  -4,   /* Main Diag
down*/
            0,   1,   1,   0,  -4,  -4,   0,
            0,   1,   0,   0,  -4,   0,   0,
            0,   0,  -4,  -4,   0,   0,   0    },

{ 0,   0,  -4,  -4,   0,   0,   0,
```

```
       0,  1,  0,  0, -4,  0,  0,
       0,  1,  1,  0, -4, -4,  0,   /* Boundary Edge */
       0,  0,  1,  1,  0,  0, -4,   /* Minor Diag up */
       0,  0,  0,  1,  1,  0, -4,
       0,  0,  0,  0,  1,  1,  0,
       0,  0,  0,  0,  0,  0,  0  }, { 0,  0,  0,  0,  0,  0,  0,
       0,  1,  1,  0,  0,  0,  0,
      -4,  0,  1,  1,  0,  0,  0,   /* Boundary Edge */
      -4,  0,  0,  1,  1,  0,  0,   /* Minor Diag dwn*/
       0, -4, -4,  0,  1,  1,  0,
       0,  0, -4,  0,  0,  1,  0,
       0,  0,  0, -4, -4,  0,  0  }, { 0, -4, -4,  0,  0,  0,  0,
       0,  0,  1, -4,  0,  0,  0,
       0,  1,  1,  1, -4,  0,  0,   /* Boundary Protrusion*/
       0,  1,  0,  1,  1, -4,  0,   /* Right */
       0,  1,  1,  1, -4,  0,  0,
       0,  0,  1, -4,  0,  0,  0,
       0, -4, -4,  0,  0,  0,  0  }, { 0,  0,  0,  0, -4, -4,  0,
       0,  0,  0, -4,  1,  0,  0,
       0,  0, -4,  1,  1,  1,  0,   /* Boundary Protrusion*/
       0, -4,  1,  1,  0,  1,  0,   /* Left */
       0,  0, -4,  1,  1,  1,  0,
```

```
              0,   0,   0,  -4,   1,   0,   0,
              0,   0,   0,   0,  -4,  -4,   0    },

{   0,   0,   0,   0,   0,   0,   0,
             -4,   0,   1,   1,   1,   0,  -4,
             -4,   1,   1,   0,   1,   1,  -4,   /* Boundary
Protrusion*/
              0,  -4,   1,   1,   1,  -4,   0,   /* Down */
              0,   0,  -4,   1,  -4,   0,   0,
              0,   0,   0,  -4,   0,   0,   0,
              0,   0,   0,   0,   0,   0,   0    }, {   0,   0,   0,   0,   0,   0,   0,
              0,   0,   0,  -4,   0,   0,   0,
              0,   0,  -4,   1,  -4,   0,   0,   /* Boundary
Protrusion*/
              0,  -4,   1,   1,   1,  -4,   0,   /* Up   */
             -4,   1,   1,   0,   1,   1,  -4,
             -4,   0,   1,   1,   1,   0,  -4,
              0,   0,   0,   0,   0,   0,   0    }, {   0,   0,   0,   0,   0,   0,   0,
              0,   0,   0,   1,   1,   1,   0,
              0,   0,   1,   1,  -4,  -4,   0,   /* Boundary
Intrusion */
              0,   0,   1,  -4,   0,   0,   0,   /* Right */
              0,   0,   1,   1,  -4,  -4,   0,
              0,   0,   0,   1,   1,   1,   0,
              0,   0,   0,   0,   0,   0,   0    }, {   0,   0,   0,   0,   0,   0,   0,
              0,   1,   1,   1,   0,   0,   0,
              0,  -4,  -4,   1,   1,   0,   0,   /* Boundary
```

Intrusion */
```
              0,  0,  0, -4,  1,  0,  0,   /* Left    */
              0, -4, -4,  1,  1,  0,  0,
              0,  1,  1,  1,  0,  0,  0,
              0,  0,  0,  0,  0,  0,  0   }, { 0,  0,  0,  0,  0,  0,  0,
              0,  0,  0,  0,  0,  0,  0,
              0,  0,  1,  1,  1,  0,  0,   /* Boundary
Intrusion */
              0,  1,  1, -4,  1,  1,  0,   /* Down    */
              0,  1, -4,  0, -4,  1,  0,
              0,  1, -4,  0, -4,  1,  0,
              0,  0,  0,  0,  0,  0,  0   }, { 0,  0,  0,  0,  0,  0,  0,
              0,  1, -4,  0, -4,  1,  0,
              0,  1, -4,  0, -4,  1,  0,   /* Boundary
Intrusion */
              0,  1,  1, -4,  1,  1,  0,   /* Up      */
              0,  0,  1,  1,  1,  0,  0,
              0,  0,  0,  0,  0,  0,  0,
              0,  0,  0,  0,  0,  0,  0   } };

static int    Bias[16] = {-4, -4, -4, -4, -4, -4, -4, -4,
              -6, -6, -6, -6, -7, -7, -7, -7 };

int    Height, Width;
int    I, J, M;
int    halfwidth, halfheight;
int    HorizQuarter[4], VertThird[3];
int    Topcnt, Bottomcnt, totalpix;
float  ratio, QuarterHist[4], VertHist[3];
```

```
int  bandcnt,incr;

Height = EndLine - Line;
     Width = EndCol - Col;

Topcnt = Bottomcnt = 0;
     totalpix = 0;

for (I = 0; I < 4; I++) HorizQuarter[I] = 0;
     for (I = 0; I < 3; I++) VertThird[I] = 0;

/* First, the bounding character box is cut in half
horizontally
        to determine if the character is top-heavy,
bottom-heavy or
        evenly weighted.              */
     for (I = Line; I < EndLine; I++)
     {
         for (J = Col; J < EndCol; J++)
         {
           if ( (I < (int)( (float)(Line + EndLine)/2.0))
&&
                   SecondLineBufPtr[I][J] != 0)
Topcnt++;
             else if ( (I >= (int)( (float)(Line +
EndLine)/2.0) )
                 && SecondLineBufPtr[I][J] != 0)
Bottomcnt++;
             if ( (I < (int)( (float)(EndLine - Line)*0.25 +
(float)Line))
                 && SecondLineBufPtr[I][J] != 0)
HorizQuarter[0]++;
             else if ( ( I < (int)( (float)(EndLine -
Line)*0.5 + (float) Line)) &&
```

```
                  ( I >= (int)((float)(EndLine - Line)*.25
+ (float) Line)) &&
                  SecondLineBufPtr[I][J] != 0)
HorizQuarter[1]++;
        else if ( ( I < (int)( (float)(EndLine -
Line)*0.75 + (float) Line)) &&
                  ( I >= (int)( (float)(EndLine - Line)*.5
+ (float) Line)) &&
                  SecondLineBufPtr[I][J] != 0)
HorizQuarter[2]++;
        else if ((I >= (int)( (float)(EndLine -
Line)*0.75 + (float) Line)) && SecondLineBufPtr[I][J] !=
0)
                  HorizQuarter[3]++;
        if ( (J < (int)( (float)(EndCol - Col)/3.0 +
(float)Col)) &&
                  SecondLineBufPtr[I][J] != 0)
VertThird[0]++;
        else if ( (J < (int)( (float)(EndCol -
Col)*2./3. + (float)Col)) &&
                  (J >= (int)((float)(EndCol - Col)/3. +
(float) Col)) &&
                  (SecondLineBufPtr[I][J] != 0))
VertThird[1]++;
        else if ( (J >= (int)( (float)(EndCol -
Col)*2./3. + (float) Col)) &
                  (SecondLineBufPtr[I][J] != 0))
VertThird[2]++;
        }
    } if (Bottomcnt > 0)
    {
        ratio = ((float) Topcnt/ (float) Bottomcnt);
```

```
/*        printf ("%5.3f Top/Bottom ratio\n", ratio); */
          totalpix = Topcnt + Bottomcnt;
   }
   else
   {
          ratio = 0.;
          totalpix = Topcnt + Bottomcnt;
   } if ( ratio <= 1.2)
          TempArray[0] = 0.0;

else if ( ratio > 1.80)
          TempArray[0] = 1.0;

else
          TempArray[0] = 0.5;

for (I =0; I < 4; I++)
   {
          QuarterHist[I] = ( (float) HorizQuarter[I] /
                  (float) (Width-4) / ((float)(EndLine -
Line-4)/4.) );
            if (QuarterHist[I] >= .3)
                    TempArray[I+1] = 1.0;
            else if (QuarterHist[I] <= .1)
                    TempArray[I+1] = 0.0;
            else TempArray[I+1] = 0.5;
   } for (I = 0; I < 3; I++)
   {
          VertHist[I] = ( (float) VertThird[I] /
                  (float) Height / (float)( (EndCol -
Col)/3.) );
            if (VertHist[I] >= .3)
```

```
                TempArray[I+5] = 1.0;
        else if (VertHist[I] <= .1)
                TempArray[I+5] = 0.0;
        else TempArray[I + 5] = 0.5;
}
```

/* New feature added 1/26/89 */

/* This feature is based upon "Vertical Crossings" as found in the
   paper "OMNIREC: A Character Recognition System" from the AI Lab
   out of the University of Texas at Austin. An character (unnormalized)
   defined by its bounding box, is cut in thirds horizontally and
   vertically to form 9 quadrants. A vertical band is passed
   thru the middle of each column formed from quads 1,4,7; 2,5,8 or
   3,6,9. If the band intersects a character region, a counter is
   incremented for that region. The maximum number of intersections
   per band is assumed to be 4. Thus a total of 12 bits (3 bands X 4
   intersections/band) will be used to describe this feature.
   The same thing is done in a horizontal scheme for another
   12 bits of features.                                          */

```
halfwidth = (Width - 4)/2.;
halfheight = (Height-4)/2.;
```

```
    incr = 0;
    for (I = 8; I < Width; I+=10)
/*  for (I = (Col + Width/6); I < (Col + Width); I +=
Width/3) */
    {
        bandcnt = 0;
        for (J = Line; J < EndLine; J++)
        {
         if (SecondLineBufPtr[J][I] == 255)
         {
            bandcnt++;
            while (SecondLineBufPtr[J++][I] != 0 && J <
EndLine);
         }
        }
    /*      Results are written right justified in the
field of 4 bits.
        I.e. 2 band intersections would be written as 0
0 1 1 in
        the appropriate location of the output vector.
*/ for(M = 0; M < (4-bandcnt); M++)
TempArray[M+incr+8] = 0.0;
        for(M = (4-bandcnt);M < 4; M++)
TempArray[M+incr+8] = 1.0;
        incr+=4;

}

/* Horizontal Bands */ incr = 0;
    for (I = 8; I < Height; I+=10)
/*  for (I = (Line + Height/6); I < (Line + Height);
```

```
I+=Height/3) */
    {
        bandcnt = 0;
        for (J = Col; J < EndCol; J++)
        {
          if (SecondLineBufPtr[I][J] == 255)
          {
                bandcnt++;
                while (SecondLineBufPtr[I][J++] != 0 && J <
EndCol);
          }
        }
        for(M = 0; M < (4-bandcnt); M++)
TempArray[M+20+incr] = 0.0;
        for(M = (4-bandcnt);M < 4; M++)
TempArray[M+20+incr] = 1.0;
        incr+=4;
    }

*numfeatures = 32;
}
/*****************************************************
********************/
#define    NORM_STANDARDCHARHEIGHT   32
#define    NORM_STANDARDCHARWIDTH    32

ExtractCurvatureFeatures    (ThinBufPtr,
            Line,  /* Curvature data is obtained
from     */
            Col,   /* a normalized thinned
character      */
            height,    /* that is 32 X 32 in sized
as       */
            width,     /* defined by
```

NORM_STANDARDCHARSIZE    */

ObjectCounter,

TempArray, numfeatures)

BOOLEAN

ThinBufPtr[STANDARDCHARHEIGHT][STANDARDCHARWIDTH];

double    *TempArray;         /* Where the feature vector
is written */ int   *numfeatures, Line, Col;

int   height, width, ObjectCounter;

{ static int    CurvQuad1[7][7] = {
        {-4, -4, -4, -4, -4,  0, -4},
        { 0,  0,  0,  0,  0, -4,  0},
        { 1,  1,  1,  0,  0,  0, -4},
        { 0,  0,  1,  1,  0,  0, -4},
        { 0,  0,  0,  1,  1,  0, -4},
        { 0, -4,  0,  0,  1,  0, -4},
        {-4,  0,  0,  0,  1,  0, -4} };

static int    CurvQuad2[7][7] = {
        {-4,  0,  0,  0,  1,  0, -4},
        { 0, -4,  0,  0,  1,  0, -4},
        { 0,  0,  0,  1,  1,  0, -4},
        { 0,  0,  1,  1,  0,  0, -4},
        { 1,  1,  1,  0,  0,  0, -4},
        { 0,  0,  0,  0,  0, -4,  0},
        {-4, -4, -4, -4, -4,  0, -4} };

static int    CurvQuad3[7][7] = {
        {-4,  0,  1,  0,  0,  0, -4},
        {-4,  0,  1,  0,  0, -4,  0},
        {-4,  0,  1,  1,  0,  0,  0},
        {-4,  0,  0,  1,  1,  0,  0},

```
        {-4,  0,  0,  0,  1,  1,  1},
        { 0, -4,  0,  0,  0,  0,  0},
        {-4,  0, -4, -4, -4, -4,  0} };

static int    CurvQuad4[7][7] = {
        {-4,  0, -4, -4, -4, -4,  0},
        { 0, -4,  0,  0,  0,  0,  0},
        {-4,  0,  0,  0,  1,  1,  1},
        {-4,  0,  0,  1,  1,  0,  0},
        {-4,  0,  1,  1,  0,  0,  0},
        {-4,  0,  1,  0,  0, -4,  0},
        {-4,  0,  1,  0,  0,  0, -4} };

static int    Bias[4] = { -1020, -1020, -1020, -1020} ;
static int
Curv1Tracker[NORM_STANDARDCHARHEIGHT][NORM_STANDARDCHARWIDTH], Curv2Tracker[NORM_STANDARDCHARHEIGHT][NORM_STANDARDCHARWIDTH], Curv3Tracker[NORM_STANDARDCHARHEIGHT][NORM_STANDARDCHARWIDTH], Curv4Tracker[NORM_STANDARDCHARHEIGHT][NORM_STANDARDCHARWIDTH];
static BOOLEAN
workspace[NORM_STANDARDCHARHEIGHT+6][NORM_STANDARDCHARWIDTH+6];

double    CurvVector[4];
static int    Threshold[4];
int  sum[4], I, J, N, M;
register int fasti, fastj;
```

```
int     row, column, num_neighbors, cnte, cntj;
BOOLEAN pixel;
BOOLEAN LookAround();
double  distance, sqrt();

Threshold[0] = 0;
    Threshold[1] = 2;

for (fasti = 0; fasti < NORM_STANDARDCHARHEIGHT;
fasti++)
    {
        for (fastj = 0; fastj < NORM_STANDARDCHARWIDTH;
fastj++)
        {
         workspace[fasti][fastj] = 0;
         Curv1Tracker[fasti][fastj] = 0;
         Curv2Tracker[fasti][fastj] = 0;
         Curv3Tracker[fasti][fastj] = 0;
         Curv4Tracker[fasti][fastj] = 0;
        }
        for (fastj = NORM_STANDARDCHARWIDTH; fastj <
NORM_STANDARDCHARWIDTH+6; fastj++)
        {
         workspace[fasti][fastj] = 0;
        }
    } for (fasti = NORM_STANDARDCHARHEIGHT;fasti <
NORM_STANDARDCHARHEIGHT+6; fasti++)
    {
        for (fastj = NORM_STANDARDCHARWIDTH;fastj <
NORM_STANDARDCHARWIDTH+6; fastj+:
```

```
            {
            workspace[fasti][fastj] = 0;
            }
        } for (fasti = 0; fasti < NORM_STANDARDCHARHEIGHT;
fasti++)
        {
        for (fastj = 0; fastj < NORM_STANDARDCHARWIDTH;
fastj++)
            {
            workspace[fasti+3][fastj+3] =
ThinBufPtr[fasti][fastj];
            }
        } for (I = 0; I < NORM_STANDARDCHARHEIGHT; I++)
        {
        for (J = 0; J < NORM_STANDARDCHARWIDTH; J++)
            {
            for (N = 0; N < 4; N++) sum[N] = 0;
            for(fasti = 0; fasti < 7; fasti++)
                {
                for(fastj = 0; fastj < 7; fastj++)
                    {
                    pixel =
workspace[I+fasti+Line][J+fastj+Col];
                    if (pixel)
                        {
                        sum[0] += pixel *
CurvQuad1[fasti][fastj];
                        sum[1] += pixel *
```

```
CurvQuad2[fasti][fastj];
                sum[2] += pixel *
CurvQuad3[fasti][fastj];
                sum[3] += pixel *
CurvQuad4[fasti][fastj];
            }
          }
        }
        for (M = 0; M < 4; M++)
        {
            sum[M] = sum[M] + Bias[M];
        } if (sum[0] >= Threshold[0]) Curv1Tracker[I][J] = 1;

if (sum[1] >= Threshold[0]) Curv2Tracker[I][J] = 1;

if (sum[2] >= Threshold[0]) Curv3Tracker[I][J] = 1;

if (sum[3] >= Threshold[0]) Curv4Tracker[I][J] = 1;
      }
    }

GetNormCurveData    ( Curv1Tracker,
                NORM_STANDARDCHARHEIGHT,
                NORM_STANDARDCHARWIDTH,
                Threshold[1],
                &CurvVector);
    for (I = 0; I < 4; I++) TempArray[I] = CurvVector[I];

GetNormCurveData    ( Curv2Tracker,
                NORM_STANDARDCHARHEIGHT,
```

```
                        NORM_STANDARDCHARWIDTH,
                        Threshold[1],
                        &CurvVector);

for (I = 0; I < 4; I++) TempArray[I+4] = CurvVector[I];

GetNormCurveData    ( Curv3Tracker,
                        NORM_STANDARDCHARHEIGHT,
                        NORM_STANDARDCHARWIDTH,
                        Threshold[1],
                        &CurvVector);

for (I = 0; I < 4; I++) TempArray[I+8] = CurvVector[I];

GetNormCurveData    ( Curv4Tracker,
                        NORM_STANDARDCHARHEIGHT,
                        NORM_STANDARDCHARWIDTH,
                        Threshold[1],
                        &CurvVector);

for (I = 0; I < 4; I++) TempArray[I+12] = CurvVector[I];

*numfeatures = 16;
}
/*************************************************************************/
ExtractTemplateFeaturesVer2    (    ThinBufPtr,
                Line,
                Col,
                Height,
                Width,
                ObjectCounter,
                TempArray,
                numfeatures)
```

```
BOOLEAN
ThinBufPtr[STANDARDCHARHEIGHT][STANDARDCHARWIDTH];
double    *TempArray;         /* Where the feature vector
is written */
int    *numfeatures, Line, Col;
int    Height, Width, ObjectCounter;
{
static int     VertLineTemplate[7][7] = {
       { 0,  0,  0,  0,  0,  0,  0},
       {-4, -4,  1,  1,  1,  0, -4},
       {-4,  0,  1,  1,  1,  0, -4},
       {-4, -4,  0,  1,  0, -4, -4},
       {-4,  0,  1,  1,  1,  0, -4},
       {-4,  0,  1,  1,  1, -4, -4},
       { 0,  0,  0,  0,  0,  0,  0} };

static int     HorizLineTemplate[7][7] = {
       { 0, -4, -4, -4, -4, -4,  0},
       { 0, -4,  0, -4,  0,  0,  0},
       { 0,  1,  1,  0,  1,  1,  0},
       { 0,  1,  1,  1,  1,  1,  0},
       { 0,  1,  1,  0,  1,  1,  0},
       { 0,  0,  0, -4,  0, -4,  0},
       { 0, -4, -4, -4, -4, -4,  0} };

static int     MinDiagTemplate[7][7] = {
       { 0,  0, -4, -4,  0,  0,  0},
       { 0, -4,  0,  0,  1,  0,  0},
       {-4,  0,  0,  1,  1,  1, -4},
       {-4,  0,  1,  1,  1,  0, -4},
       {-4,  1,  1,  1,  0,  0, -4},
       { 0,  0,  1,  0,  0, -4,  0},
       { 0,  0,  0, -4, -4,  0,  0} };
```

```
static int     MajDiagTemplate[7][7] = {
        {  0,   0,   0,  -4,  -4,   0,   0},
        {  0,   0,   1,   0,   0,  -4,   0},
        { -4,   1,   1,   1,   0,   0,  -4},
        { -4,   0,   1,   1,   1,   0,  -4},
        { -4,   0,   0,   1,   1,   1,  -4},
        {  0,  -4,   0,   0,   1,   0,   0},
        {  0,   0,  -4,  -4,   0,   0,   0} };

static int     CurvOpenEast[7][7] = {
        {  0,  -4,  -4,  -4,   0,   0,   0},
        { -4,   0,   0,   1,   1,   1,   0},
        { -4,   0,   1,   1,   1,   0,   0},
        { -4,   1,   1,   1,  -4,  -4,  -4},
        { -4,   0,   1,   1,   1,   0,   0},
        { -4,   0,   0,   1,   1,   1,   0},
        {  0,  -4,  -4,  -4,   0,   0,   0} };

static int     CurvOpenWest[7][7] = {
        {  0,   0,   0,  -4,  -4,  -4,   0},
        {  0,   1,   1,   1,   0,   0,  -4},
        {  0,   0,   1,   1,   1,   0,  -4},
        { -4,  -4,  -4,   1,   1,   1,  -4},
        {  0,   0,   1,   1,   1,   0,  -4},
        {  0,   1,   1,   1,   0,   0,  -4},
        {  0,   0,   0,  -4,  -4,  -4,   0} };

static int     CurvOpenNorth[7][7] = {
        {  0,   0,   0,  -4,   0,   0,   0},
        {  0,   1,   0,  -4,   0,   1,   0},
        {  0,   1,   1,  -4,   1,   1,   0},
        { -4,   1,   1,   1,   1,   1,  -4},
        { -4,   0,   1,   1,   1,   0,  -4},
        { -4,   0,   0,   1,   0,   0,  -4},
        {  0,  -4,  -4,  -4,  -4,  -4,   0} };
```

```
static int     CurvOpenSouth[7][7] = {
        { 0, -4, -4, -4, -4, -4,  0},
        {-4,  0,  0,  1,  0,  0, -4},
        {-4,  0,  1,  1,  1,  0, -4},
        {-4,  1,  1,  1,  1,  1, -4},
        { 0,  1,  1, -4,  1,  1,  0},
        { 0,  1,  0, -4,  0,  1,  0},
        { 0,  0,  0, -4,  0,  0,  0} };

int
HorizLineTracker[STANDARDCHARHEIGHT][STANDARDCHARWIDTH],

VertLineTracker[STANDARDCHARHEIGHT][STANDARDCHARWIDTH];
int
MajDiagTracker[STANDARDCHARHEIGHT][STANDARDCHARWIDTH], MinDiagTracker[STANDARDCHARHEIGHT][STANDARDCHARWIDTH];
int
CurvNorthTracker[STANDARDCHARHEIGHT][STANDARDCHARWIDTH], CurvSouthTracker[STANDARDCHARHEIGHT][STANDARDCHARWIDTH], CurvEastTracker[STANDARDCHARHEIGHT][STANDARDCHARWIDTH], CurvWestTracker[STANDARDCHARHEIGHT][STANDARDCHARWIDTH];

double  HorizOutputFeatureVector[8],
VertOutputFeatureVector[8],
    MajDiagOutputFeatureVector[4],
MinDiagOutputFeatureVector[4],
    CurvVector[4], location_vector[18];

static   int    Threshold[9];
```

```
static int    Bias[8] = { -2, -2, -2, -2, -6, -6, -6,
-6};
/* static  int Bias[8] = { -4, -4, -4, -4, -6, -6, -6,
-6} ;*/
int  sum[8], I, J, N, M, q, n;
register int fasti, fastj;
int  row, column, num_neighbors, cnte, cntj;
BOOLEAN   pixel;
int  juncture_locations[2][10],
endpoint_locations[2][10];
BOOLEAN   LookAround();
double    distance, distancetracker[10], sqrt();
    for (I = 0; I < 18; I++) location_vector[I] = 0.;
    for (fasti = 0; fasti < 2; fasti++)
    {
        for (fastj = 0; fastj < 6; fastj++)
        {
         endpoint_locations[fasti][fastj] = 0;
         juncture_locations[fasti][fastj] = 0;
        }
    } for (fasti = 0; fasti < 10; fasti++)
distancetracker[fasti] = 0.0;

for (fasti = 0; fasti < STANDARDCHARHEIGHT; fasti++)
    {
        for (fastj = 0; fastj < STANDARDCHARWIDTH;
fastj++)
        {
         HorizLineTracker[fasti][fastj] = 0;
         VertLineTracker[fasti][fastj] = 0;
         MajDiagTracker[fasti][fastj] = 0;
         MinDiagTracker[fasti][fastj] = 0;
```

```
            CurvNorthTracker[fasti][fastj] = 0;
            CurvSouthTracker[fasti][fastj] = 0;
            CurvEastTracker[fasti][fastj] = 0;
            CurvWestTracker[fasti][fastj] = 0;
        }
    } cnte = cntj = 0;
    for (I = 0; I < Height; I++)
    {
        for (J = 0; J < Width; J++)
        {
         distance = 0.;
         num_neighbors=0;
         if ( ThinBufPtr[I][J] != 0 &&
             LookAround(ThinBufPtr, I,J,&num_neighbors) &&
             num_neighbors == 1)   /* Found an endpoint */
         {
             endpoint_locations[0][cnte] = I;
             endpoint_locations[1][cnte++] = J;
         }
         else if (ThinBufPtr[I][J] != 0 &&
             cntj == 0 &&
             num_neighbors >= 3)   /* Found a juncture */
         {
             juncture_locations[0][cntj] = I;
             juncture_locations[1][cntj++] = J;
         }
         else if (ThinBufPtr[I][J] != 0 &&
             cntj > 0 &&
```

```
                    num_neighbors >= 3)   /* Found a juncture
*/
            {
                for (q = 0; q <= cntj-1; q++)
                {
                    distancetracker[q] = sqrt (
(double)(I-juncture_locations[0][q]) *
(I-juncture_locations[0][q]) +

(double)(J-juncture_locations[1][q]) *

(J-juncture_locations[1][q]) );
                }
                q = 0;
                while (distancetracker[q++] > 2.);
                n = q-1;
                if (distancetracker[n] < 2. &&
distancetracker[n] != 0.)
                {
                    juncture_locations[0][n] = I;
                    juncture_locations[1][n] = J;
                }
                else
                {
                    juncture_locations[0][cntj] = I;
                    juncture_locations[1][cntj++] = J;
                }
            } for (N = 0; N < 8; N++) sum[N] = 0;
            for(fasti = 0; fasti < 7; fasti++)
            {
                for(fastj = 0; fastj < 7; fastj++)
```

```
            {
            pixel =
ThinBufPtr[I+fasti+Line][J+fastj+Col];
            if (pixel)
            {
                sum[0] += pixel *
HorizLineTemplate[fasti][fastj];
                sum[1] += pixel *
VertLineTemplate[fasti][fastj];
                sum[2] += pixel *
MajDiagTemplate[fasti][fastj];
                sum[3] += pixel *
MinDiagTemplate[fasti][fastj];
                sum[4] += pixel *
CurvOpenNorth[fasti][fastj];
                sum[5] += pixel *
CurvOpenSouth[fasti][fastj];
                sum[6] += pixel *
CurvOpenEast[fasti][fastj];
                sum[7] += pixel *
CurvOpenWest[fasti][fastj];
            }
          }
        }
        for (M = 0; M < 8; M++)
        {
            sum[M] = sum[M] + 255 * Bias[M];
        } if (sum[0] > Threshold[0])
HorizLineTracker[I+3][J+3] = 1;
        if (sum[1] > Threshold[1])
VertLineTracker[I+3][J+3] = 1;
        if (sum[2] > Threshold[2])
```

```
MajDiagTracker[I+3][J+3] = 1;
        if (sum[3] > Threshold[3])
MinDiagTracker[I+3][J+3] = 1;
        if (sum[4] > Threshold[4])
CurvNorthTracker[I+3][J+3] = 1;
        if (sum[5] > Threshold[5])
CurvSouthTracker[I+3][J+3] = 1;
        if (sum[6] > Threshold[6])
CurvEastTracker[I+3][J+3] = 1;
        if (sum[7] > Threshold[7])
CurvWestTracker[I+3][J+3] = 1;
      }
    }

/*    printf ("The number of endpoints is %d\n", cnte);
*/
/*    printf ("The number of junctures is %d\n", cntj);
*/
/*    fprintf (debugfp, "Number %d: endpoints = %d,
junctures = %d\n", ObjectCounter,cnte,cntj); */

GetHorizLineFeatureData ( HorizLineTracker,
                    Height,
                    Width,
                    &HorizOutputFeatureVector);

for (I = 0; I < 8; I++) TempArray[I] =
HorizOutputFeatureVector[I];

GetVertLineFeatureData   ( VertLineTracker,
                    Height,
                    Width,
                    &VertOutputFeatureVector);
```

```
        for (I = 0; I < 8; I++) TempArray[I+8] =
VertOutputFeatureVector[I];

GetMajorDiagFeatureData ( MajDiagTracker,
                        Height,
                        Width,
                        &MajDiagOutputFeatureVector);

for (I = 0; I < 4; I++) TempArray[I+16] =
MajDiagOutputFeatureVector[I];

GetMinorDiagFeatureData ( MinDiagTracker,
                        Height,
                        Width,
                        &MinDiagOutputFeatureVector);

for (I = 0; I < 4; I++) TempArray[I+20] =
MinDiagOutputFeatureVector[I];

Threshold[8] = 25;

GetCurveData    ( CurvNorthTracker,
                    Height,
                    Width,
                    Threshold[8],
                    &CurvVector);
        for (I = 0; I < 4; I++) TempArray[I+24] =
CurvVector[I];

GetCurveData    ( CurvSouthTracker,
                    Height,
                    Width,
                    Threshold[8],
                    &CurvVector);
```

```
        for (I = 0; I < 4; I++) TempArray[I+28] =
CurvVector[I];

GetCurveData    ( CurvEastTracker,
                    Height,
                    Width,
                    Threshold[8],
                    &CurvVector);
        for (I = 0; I < 4; I++) TempArray[I+32] =
CurvVector[I];

GetCurveData    ( CurvWestTracker,
                    Height,
                    Width,
                    Threshold[8],
                    &CurvVector);
        for (I = 0; I < 4; I++) TempArray[I+36] =
CurvVector[I];

Encode_Locations    (endpoint_locations,
                        cnte,
                        Height,
                        Width,
                        &location_vector);

for (I = 0; I < 22; I++) TempArray[I+40] =
location_vector[I];

Encode_Locations    (juncture_locations,
                        cntj,
                        Height,
                        Width,
                        &location_vector);
```

```
    for (I = 0; I < 22; I++) TempArray[I+62] = location_vector[I];

/*  *numfeatures = 66;  */
    *numfeatures = 84;
}
/*********************************************************
******************/
GetCurveData   ( CurvTracker,
           height,
           width,
           threshold,
           CurvVector)
int  CurvTracker[STANDARDCHARHEIGHT][STANDARDCHARWIDTH];
int  height, width, threshold;
double   *CurvVector;
{

/*  This procedure simply counts the number of non-zero values in the
    curve tracker array based on the quadrants as shown in the diagram.
    *****     If the count for a quadrant exceeds a threshold, then the
    *0*1*     CurvVector pointer is set to 1, else it is set to 0.
    *****
    *2*3*
    *****                                            */ int  i,j,cnt[4];
int  halfwidth, halfheight;
```

```
halfwidth = (int) ( (float)width/2.);
halfheight = (int) ( (float)height/2.);
    for (i = 0; i < 4; i++) cnt[i] = 0;
    for (i = 0; i < height; i++)
    {
        for (j = 0; j < height; j++)
        {
         if (CurvTracker[i][j] != 0)
         {
            if (i < halfheight && j < halfwidth)
cnt[0]++;
            else if (i < halfheight && j >= halfwidth)
cnt[1]++;
            else if (i >= halfheight && j < halfwidth)
cnt[2]++;
            else if (i >= halfheight && j >= halfwidth)
cnt[3]++;
         }
        }
    }
/*  fprintf (debugfp, "Baird Curve Data"); */
    for (i = 0; i < 4; i++)
    {
/*      fprintf (debugfp,"    %d ",cnt[i]); */
        if (cnt[i] > threshold)
          CurvVector[i]=1.0;
        else
          CurvVector[i] = 0.0;
    }
/*  fprintf (debugfp, "\n"); */
}
/***********************************************************
******************/
GetNormCurveData    ( CurvTracker,
                height,
```

```
              width,
              threshold,
              CurvVector)
int CurvTracker[NORM_STANDARDCHARHEIGHT][NORM_STANDARDCHARWIDTH];
int   height, width, threshold;
double    *CurvVector;
{

/*   This procedure simply counts the number of non-zero values in the
     curve tracker array based on the quadrants as shown in the diagram.
     *****     If the count for a quadrant exceeds a threshold, then the
     *0*1*     CurvVector pointer is set to 1, else it is set to 0.
     *****
     *2*3*
     *****                                                              */ int   i,j,cnt[4];
int   halfwidth, halfheight;

halfwidth = (int) ( (float)width/2.);
      halfheight = (int) ( (float)height/2.);

for (i = 0; i < 4; i++) cnt[i] = 0;
      for (i = 0; i < height; i++)
      {
          for (j = 0; j < height; j++)
          {
```

```
                if (CurvTracker[i][j] != 0)
                {
                    if (i < halfheight && j < halfwidth)
cnt[0]++;
                    else if (i < halfheight && j >= halfwidth)
cnt[1]++;
                    else if (i >= halfheight && j < halfwidth)
cnt[2]++;
                    else if (i >= halfheight && j >= halfwidth)
cnt[3]++;
                }
            }
        }
/*      fprintf (debugfp, " Norm Curve Data"); */
        for (i = 0; i < 4; i++)
        {
/*          fprintf (debugfp,"    %d ",cnt[i]); */
            if (cnt[i] > threshold)
              CurvVector[i]=1.0;
            else
              CurvVector[i] = 0.0;
        }
/*      fprintf (debugfp, "\n"); */
}
/****************************************************
******************/
Encode_Locations (endpoint_locations,
            cnte,
            height,
            width,
            endpoint_vector)

int   endpoint_locations[2][10];
int   cnte, height, width;
```

```
double    *endpoint_vector;
{
int   i,ii,j,cnt;
int   x,y, region[12][2] = {
{0,1},{1,2},{3,4},{4,5},{6,7},{7,8},
              {0,3},{3,6},{1,4},{4,7},{2,5},{5,8}
};
int   c[9][2];  /* center points of each region  */
int   w1,w2,h1,h2;
int   xindex, yindex, primarysection, secondarysection;
int   quadrants[3][3] = { (0,1,2},{3,4,5},{6,7,8} };
static   int *neighbor_list[4], tempval;
float    xx,yy,distance[5],mindist ;
int   mindistindex;
static  double temp_vector[12];

/* the first 10 positions of the endpoint vector
contain the quantity
        of endpoints in the character and are left
justified. For example,
        if 2 endpoints exist, then the first 6 values of
the vector would
        be [0,0,0,0,1,1]. If 4 endpoints exist, the
vector would be
        [0,0,1,1,1,1].   */ for (i = 0; i < 22; i++)  endpoint_vector[i] = 0.;

for (i = 0; i < (10-cnte); i++)  endpoint_vector[i]
= 0.;
    while (i < 10) endpoint_vector[i++] = 1.;
```

```
/* The next 12 positions of the endpoint vector
contain location
    information. The character is cut in thirds
vertically and
    horizontally (creating 9 regions). The mapping
used is like this:

******
*0*1*2*    The locations of the endpoints were stored
when they
******    were identified. 12 values will represent
possible
*3*4*5*    regions. For example, an endpoint can reside
in region
******    0-1,1-2,3-4,4-5,6-7,or 7-8. An endpoint can
also reside
*6*7*8*    in 0-3,3-6,1-4,4-7,2-5, or 5-8. To determine
which 2-block
******    region the endpoint resides in, a distance
calculation will
    be done from the primary region (the block
where the pixel
    is in (0 thru 8) ) to all possible secondary
regions. The
    shortest distance will correspond to the second
block which
    will be used to describe the region (primary
block and
    secondary block). Note that 9 can never be a
primary block. */

/* First, the center points for each quadrant are
identified and stored in
    a  trix called c[9][2]   */
```

```
for (i = 0; i < 3; i++)
{
        c[i][1] = (int)( (float) height/6.0);
        c[i][0] = (int)( (float) width /6.0) +
                (int) ((float)i *(float) width/3.0);
        c[i+3][1] = (int) ( (float)height/6. + (float)
height/3.);
        c[i+3][0] = (int)( (float) width/6.) +
                (int) ((float)i *(float) width/3.0);
        c[i+6][1] = (int) ( (2.* (float)
height/3.)+(float)height/6.);
        c[i+6][0] = (int)( (float) width/6.) +
                (int) ((float)i *(float) width/3.0);
}
h1 = (int)( (float) height/3.);
h2 = (int)( (float) 2. * height / 3.);
w1 = (int)( (float) width/3.);
w2 = (int)( (float) 2. * width/ 3.);

for (i = 0; i < cnte; i++)
{
    cnt=0;
    y=endpoint_locations[0][i];   /* I index */
    x=endpoint_locations[1][i];   /* J index */
    if ( y < h1) yindex = 0;
    else if ( y < h2) yindex = 1;
    else yindex = 2;
    if (x < w1) xindex = 0;
    else if (x < w2) xindex = 1;
    else xindex = 2;

primarysection = quadrants[yindex][xindex];
```

```c
/*  Now that the primary section has been identified, all possible
    secondary regions must be identified. This will be done by
    sorting through the region array for all regions possessing
    the primary secion.        */ for (ii=0; ii<12; ii++)
    {
        if (region[ii][0] == primarysection)
            neighbor_list[cnt++] = &region[ii][1];
        if (region[ii][1] == primarysection)
            neighbor_list[cnt++] = &region[ii][0];
    } mindist = 100000.;
    for (ii = 0; ii < cnt; ii++)
    {
        tempval = *neighbor_list[ii];
        distance[ii] =( (x - c[tempval][0]) *
                (x - c[tempval][0]) ) +
                ( (y - c[tempval][1]) *
                (y-c[tempval][1]) ) ;
        if (distance[ii] < mindist)
        {
         mindist = distance[ii];
         mindistindex = ii;
        }
    }
    secondarysection = *neighbor_list[mindistindex];
```

```c
        for (ii = 0; ii < 12; ii++)
        {
                if( (region[ii][0] == primarysection &&
                  region[ii][1] == secondarysection ) ||
                 (region[ii][0] == secondarysection &&
                  region[ii][1] == primarysection ) )
                 endpoint_vector[ii+10] = 1.;
        }
/*             fprintf (debugfp, "    %d Psection = %d,
Ssection = %d\n",cnte, primarysection, secondarysection);
*/
    }
}
/**********************************************************
******************/
BOOLEAN LookAround (ThinBufPtr,
           Row,
           Col,
           Num_neighbors )
BOOLEAN
ThinBufPtr[STANDARDCHARHEIGHT][STANDARDCHARWIDTH];
int  Row, Col, *Num_neighbors;
{
int  I,J, cnt;
BOOLEAN   RetVal;

cnt = 0;
    RetVal=FALSE;

if (ThinBufPtr[Row][Col] == 0)
    {
        return (RetVal);
    }
```

```
        else
        {
                RetVal = TRUE;
                if (ThinBufPtr[Row-1][Col-1] != 0) cnt++;
                if (ThinBufPtr[Row-1][Col]   != 0) cnt++;
                if (ThinBufPtr[Row-1][Col+1] != 0) cnt++;
                if (ThinBufPtr[Row][Col-1]   != 0) cnt++;
                if (ThinBufPtr[Row][Col+1]   != 0) cnt++;
                if (ThinBufPtr[Row+1][Col-1] != 0) cnt++;
                if (ThinBufPtr[Row+1][Col]   != 0) cnt++;
                if (ThinBufPtr[Row+1][Col+1] != 0) cnt++;

*Num_neighbors = cnt;
                return (RetVal);
        }
}

/*************************************************
******************/
GetHorizLineFeatureData (    HorizLineTracker,
                        Height,
                        Width,
                        temparray)
double    *temparray;
int   HorizLineTracker[][STANDARDCHARWIDTH], Height,
Width;
{
        /* Procedure: Slice the HorizLineTracker (HLT) array into 1/8 ths
                        horizontally. For each portion that contains 1 or
                        more horizontal lines, the feature value for that section
                        is set to one, else it is set to zero.  */
```

```
int    I,J,cnt[8];
float     float_height;
int    slicenum;
int    threshold = 20;

for (I = 0; I < 8; I++) cnt[I] = 0;

float_height= (float) (Height-4) / 8.0;
    for (I = 2; I < Width-2; I++)
    {
        for (J = 2; J < Height-2; J++)
        {
            slicenum = (int)( (float)(J-2) /
float_height);
            if (HorizLineTracker[J][I] != 0)
                cnt[slicenum] = cnt[slicenum] + 1;
        }
    }

/*    fprintf (debugfp, "    Horiz Counts "); */
    for (I = 0; I < 8; I++)
    {
/*        fprintf (debugfp, "%5d",cnt[I]); */
        if(cnt[I] > threshold)
            temparray[I] = 1.0;
        else
            temparray[I] = 0.0;
    }
/*    fprintf (debugfp,"\n"); */
}
/***************************************************
******************/
GetVertLineFeatureData ( VertLineTracker,
                Height,
```

```
                    Width,
                    temparray)
double    *temparray;
int   VertLineTracker[][STANDARDCHARWIDTH], Height, Width;
{
    /* Procedure:  Slice the VertLineTracker (VLT) array
into 1/8 ths
                vertically. For each portion that
contains 1 or
                more vertical lines, the feature value for
that section
                is set to one, else it is set to zero.  */ int   I,J,cnt[8];
float     float_width;
int   slicenum;
int   threshold = 20;

for (I = 0; I < 8; I++) cnt[I] = 0;

float_width= (float) (Width-4) / 8.0;
    for (I = 2; I < Width-2; I++)
    {
        for (J = 2; J < Height-2; J++)
        {
            slicenum = (int)( (float) (I-2) /
float_width);
            if (VertLineTracker[J][I] != 0)
                cnt[slicenum] = cnt[slicenum]+1;
        }
    }

/*  fprintf (debugfp, "   Vert. Counts ");   */
    for (I = 0; I   8; I++)
```

```
        {
/*      fprintf (debugfp, "%5d",cnt[I]); */
        if(cnt[I] > threshold)
            temparray[I] = 1.0;
        else
            temparray[I] = 0.0;
    }
/*  fprintf (debugfp,"\n"); */
}
/*******************************************************
******************/
GetMajorDiagFeatureData ( MajDiagTracker,
                Height,
                Width,
                temparray)

double    *temparray;
int   MajDiagTracker[][STANDARDCHARWIDTH], Height, Width;
{
int   I,J,cnt[4];
int   threshold = 15;
float     m1,m2,m3;
float     halfwidth, halfheight;
float     cutoff1, cutoff2, cutoff3;
int   pixel;

for (I = 0; I < 4; I++) cnt[I] = 0;

halfwidth = (float) (Width-4) / 2.0;
        halfheight = (float) (Height-4) / 2.0;

m1 = -1.0*halfheight / halfwidth;
        m2 = -1.0 * (float) (Height-4) / (float) (Width-4);
```

```
    m3 = m1;

for (I = 2; I < Height-2; I++)
    {
        cutoff1 = (I - halfheight) / m1;
        cutoff2 = (I - Height) / m2;
        cutoff3 = (I - (Height + halfheight))/m3;
        for (J = 2; J < Width-2; J++)
        {
            pixel = MajDiagTracker[I][J];
            if (pixel != 0 && I > halfheight && J > cutoff3)
                cnt[3] = cnt[3]+1;
            else if (pixel != 0 && I > halfheight && J > cutoff2)
                cnt[2] = cnt[2]+1;
            else if (pixel != 0 && I > halfheight && J > cutoff1)
                cnt[1] = cnt[1] + 1;
            else if (pixel != 0 && I > halfheight && J < cutoff1)
                cnt[0] = cnt[0] + 1;
            else if (pixel != 0 && I < halfheight && J >cutoff3)
                cnt[3] = cnt[3] + 1;
            else if (pixel != 0 && I < halfheight && J > cutoff2)
                cnt[2] = cnt[2] + 1;
            else if (pixel != 0 && I < halfheight && J > cutoff1)
                cnt[1] = cnt[1] + 1;
            else if (pixel != 0 && I < halfheight && J < cutoff1)
                cnt[0] = cnt[0 + 1;
```

```c
            }

}

/*      fprintf (debugfp, "   Major Counts "); */
        for (I = 0; I < 4; I++)
        {
/*          fprintf (debugfp, "%5d",cnt[I]); */
            if(cnt[I] > threshold)
                temparray[I] = 1.0;
            else
                temparray[I] = 0.0;
        }
/*      fprintf (debugfp,"\n"); */
}
/*******************************************************
******************/
GetMinorDiagFeatureData ( MinDiagTracker,
                Height,
                Width,
                temparray)
double   *temparray;
int  MinDiagTracker[][STANDARDCHARWIDTH], Height, Width;
{
int  I,J,cnt[4];
int  threshold = 13;
float    m1,m2,m3;
float    halfwidth, halfheight;
float    cutoff1, cutoff2, cutoff3;
int  pixel;

for (I = 0; I < 4; I++) cnt[I] = 0;

halfwidth = (float) (Width-4) / 2.0;
        halfheight = (float) (Height-4) / 2.0;
```

```
m1 = halfheight / halfwidth;
m2 = (float) (Height-4) / (float) (Width-4);
m3 = m1;

for (I = 2; I < Height-2; I++)
{
        cutoff1 = (I + halfheight) / m1;
        cutoff2 =  I / m2;
        cutoff3 =  I - halfheight/ m3;
        for (J = 2; J < Width-2; J++)
        {
                pixel = MinDiagTracker[I][J];
                if (pixel != 0 && I > halfheight && J > cutoff1)
                        cnt[0] = cnt[0] + 1;
                else if (pixel != 0 && I > halfheight && J > cutoff2)
                        cnt[1] = cnt[1] + 1;
                else if (pixel != 0 && I > halfheight && J > cutoff3)
                        cnt[2] = cnt[2] + 1;
                else if (pixel != 0 && I > halfheight && J < cutoff3)
                        cnt[3] = cnt[3] + 1;
                else if (pixel != 0 && I < halfheight && J > cutoff1)
                        cnt[0] = cnt[0] + 1;
                else if (pixel != 0 && I < halfheight && J > cutoff2)
                        cnt[1] = cnt[1] + 1;
                else if (pixel != 0 && I < halfheight && J > cutoff3)
                        cnt[2] = cnt[2] + 1;
                else if (pixel != 0 && I < halfheight  J
```

```
                                  < cutoff3)
                                          cnt[3] = cnt[3] + 1;
                          }
                  }

/*        fprintf (debugfp, "   Minor Counts "); */
          for (I = 0; I < 4; I++)
              {
/*                fprintf (debugfp, "%5d",cnt[I]); */
                  if(cnt[I] > threshold)
                          temparray[I] = 1.0;
                  else
                          temparray[I] = 0.0;

}
/*        fprintf (debugfp,"\n"); */
}
/***********************************************************************
 *     Procedure: Norm_Orig_With_Beato_Scaler
 *
 *     Author: Louis J. Beato
 *     Date:     09/27/88
 *
 *     Modification History: Modified to work on thinned
images by L. Barski
 *                    03/06/89
 *     Purpose:
 *
 *     Calling Sequence:
 *
 *     Operational Details:
 *
 ***********************************************************************
 *******; .:**********/
```

```
BOOLEAN CheckOrigNeighbors ();
Norm_Orig_With_Beato_Scaler    (LineBufPtr,
                NormBufPtr,
                StartLine,
                EndLine,
                StartCol,
                EndCol)
BOOLEAN    LineBufPtr[300][4000], NormBufPtr[NORM_HORIZONTAL_RESOLUTION+4][NORM_VERTICAL_RE
SOLUTION+4];
int  StartLine, EndLine, StartCol, EndCol;
{
int  Height, Width, I, J;
double    InputI, InputJ;
double    *InputBufPtr;
double    RowRadius, ColRadius;
register  int fasti, fastj;

Height = EndLine - StartLine + 3;
    Width  = EndCol  - StartCol  + 3;

RowRadius =
((double)Height/((double)NORM_HORIZONTAL_RESOLUTION) );
    ColRadius =
((double)Width/((double)NORM_VERTICAL_RESOLUTION) );

for (fasti = 0; fasti <
NORM_HORIZONTAL_RESOLUTION+4; fasti++ )
        for (fastj = 0; fastj <
NORM_VERTICAL_RESOLUTION+4; fastj++)
            NormBufPtr[fasti][fastj] = 0;
```

```c
        for (I = 1; I < NORM_HORIZONTAL_RESOLUTION+3; I++)
        {
            for (J = 1; J < NORM_VERTICAL_RESOLUTION+3; J++)
            {
                InputI = StartLine + (I * RowRadius);
                InputJ = StartCol  + (J * ColRadius);
                if (CheckOrigNeighbors (LineBufPtr,
                            InputI,
                            InputJ,
                            RowRadius,
                            ColRadius,
                            StartLine,
                            StartCol,
                            EndLine,
                            EndCol) == TRUE)
                    NormBufPtr[I][J] = 255;
                else NormBufPtr[I][J] = 0;
            }
        }
}
/*******************************************************************
*    Procedure: Norm_Thin_With_Beato_Scaler
*
*    Author: Louis J. Beato
*    Date:      09/27/88
*
*    Modification History: Modified to work on thinned images by L. Barski
*                     03/06/89
*    Purpose:
*
*    Calling Sequence:
```

```
 *
 *    Operational Details:
 *
 ****************************************************
 *******************/
BOOLEAN CheckThinNeighbors ();
Norm_Thin_With_Beato_Scaler   (ThinBufPtr,
                    NormThinBufPtr,
                    StartLine,
                    EndLine,
                    StartCol,
                    EndCol)
BOOLEAN
ThinBufPtr[STANDARDCHARHEIGHT][STANDARDCHARWIDTH], NormThinBufPtr[NORM_HORIZONTAL_RESOLUTION][NORM_VERTICAL_
RESOLUTION];
int   StartLine, EndLine, StartCol, EndCol;
{
int   Height, Width, I, J;
double    InputI, InputJ;
double    *InputBufPtr;
double    RowRadius, ColRadius;

Height = EndLine - StartLine + 1;
     Width  = EndCol  - StartCol  + 1;

RowRadius =
((double)Height/(double)NORM_HORIZONTAL_RESOLUTION);
     ColRadius =
((double)Width/(double)NORM_VERTICAL_RESOLUTION);
        for (I = 0; I < NORM_HORIZONTAL_RESOLUTION; I++)
        {
```

```
        for (J = 0; J < NORM_VERTICAL_RESOLUTION; J++)
        {
            InputI = StartLine + (I * RowRadius);
            InputJ = StartCol  + (J * ColRadius);
            if (CheckThinNeighbors (ThinBufPtr,
                        InputI,
                        InputJ,
                        RowRadius,
                        ColRadius,
                        StartLine,
                        StartCol,
                        EndLine,
                        EndCol) == TRUE)
                NormThinBufPtr[I][J] = 255;
            else NormThinBufPtr[I][J] = 0;
        }
    }
}
```

APPENDIX B

Copyright 1990 Eastman Kodak Company

```
#include <stdio.h>
#include math
#include "[beato.ocr]header.h"
#define STANDARDCHARWIDTH         100
#define NORM_HORIZONTAL_RESOLUTION    32
#define NORM_VERTICAL_RESOLUTION      32
#define STANDARDCHARHEIGHT        100
#define NORMQTYRADII         400
#define NUMINTERVALS         3
#define MAXRADII     1000
```

```c
#define MAXINT      10
#define NUMBINS     5
#define PI          3.1415927
/*FILE   *fopen(), fprad;*/
extern  ObjectCounter;
Radialfeatures (LineBufPtr,     /* Bitmap of character */
        BoundryBufPtr,          /* Bitmap of the boundry */
        Chain_codes,            /* Array of chain codes */
        ncodes,                 /* size of chain code array
*/
        rowstart,               /* x start point of chain
codes*/
        colstart,               /* y start point of chain
codes */
        Line,                   /* starting line of the
character */
        EndLine,                /* endling line of the
character */
        Col,                    /* start col of the
character */
        EndCol,                 /* ending col of the
character */
        Perim,                  /* Perimeter length of
character*/
        Radfeatures,            /* array of rad. intercept
values */
        nfeat)                  /* size of intercept array
*/

/* BOOLEAN LineBufPtr[300][4000]; */        /* Passed in
*/
BOOLEAN
LineBufPtr[NORM_HORIZONTAL_RESOLUTION+4][NORM_VERTICAL_RE
SOLUTION+4];
```

```
BOOLEAN
BoundryBufPtr[STANDARDCHARHEIGHT][STANDARDCHARWIDTH]; /* Passed out */
int     Chain_codes[];              /* Passed in */
int     ncodes;                     /* Passed in */
int     colstart, rowstart;         /* Passed in */
int     Line,Col,EndLine, EndCol;   /* Passed in */
double  *Radfeatures;               /* Passed out */
float   Perim;                      /* Passed in */
int     *nfeat;                     /* Passed in */
{
static  int     x,y,bx, by,i,j, cnt1, cnt2, cnt;
static  int     height, width;
static  double  xcen, ycen, anglex;
        double  fabs(), sqrt();
static  double  angle[MAXRADII];
static  float   Rmax, Rmin, Rmean, Ri, Rsm, Rsolo;
        float   Amax(), Amin(), Amean(); /* functions
which return the largest or smallest value of an array */
static  double  Rad_intv, deltar;
static  float   R[MAXRADII], Rp[MAXRADII], Rnorm[NORMQTYRADII];
static  char    filename[10];
static  char    message1[] = "Normalized Radial Character Profile";
static  char    message2[] = "1st Deriv. Radial Character Profile";
static  int     meslen1 = 36;
static  int     meslen2 = 36;
static  int     Rad_int1[MAXINT], Rad_int2[MAXINT];
static  BOOLEAN done;
static  int     xcoords[MAXRADII], ycoords[MAXRADII];
static  int     Hist[50];
static  int     dcol[8] = {1, 1, 0, -1, -1, -1, 0, 1};
```

```
static    int     drow[8] = {0, -1, -1, -1, 0, 1, 1, 1};
static    int     xcenpix, ycenpix, pos;
static    int     Q, Radf[50];
static    double  dist;
int  GetRadialRegion();
static    BOOLEAN
SmoothBitmap[STANDARDCHARHEIGHT][STANDARDCHARWIDTH];

static    int  RecLength = 8, WriteFileNumber=11;

for (i = 0; i < 20; i++)
        Hist[i] = 0;

for (i = 0; i < STANDARDCHARHEIGHT; i++)
        for (j=0; j < STANDARDCHARWIDTH; j++)
        BoundryBufPtr[i][j] = 0;
    Calc_Centroid ( LineBufPtr,
            Line,
            Col,
            EndLine,
            EndCol,
            &xcen,
            &ycen);

/*  Mark the centroid pixel in the output bitmap image
*/ xcenpix = (int) xcen - Col;
    ycenpix = (int) ycen - Line;
    BoundryBufPtr[ycenpix][xcenpix] = TRUE;

done = FALSE;
```

```
    x = colstart;
    xcoords[0]=colstart;
    ycoords[0]=rowstart;
    bx = colstart - Col;
    y = rowstart;
    by = rowstart - Line;
    BoundryBufPtr[by][bx] = TRUE;
    R[0] = sqrt ( (xcen-colstart)*(xcen-colstart) +
            (ycen-rowstart)*(ycen-rowstart)  );
    if ((xcen-x) < .00001) angle[0] = PI/2.;
    else angle[0] = atan (
(ycen-rowstart)/(xcen-colstart) );
    for (i = 1; i <= ncodes;i++)
    {
        x += dcol[(Chain_codes[i-1]-1)];
        xcoords[i] = x;
        bx = x - Col;
        y += drow[(Chain_codes[i-1]-1)];
        ycoords[i] = y;
        by = y - Line;
        R[i] = sqrt ( (xcen-x)*(xcen-x) +
(ycen-y)*(ycen-y) );
        if ((xcen-x) < .00001) angle[i] = PI/2.;
        else angle[i] = atan ( (ycen-y)/(xcen-x) );
/*      Rp[i-1] = R[i-1]-R[i]; */
        BoundryBufPtr[by][bx] = TRUE;
    }

/* Next, the radii data is normalized in both amplitude and
    amount of data. Amplitude is normalized by the maximum amplitude.
    Qty. of data points is normalized to 100 data points (NORMQTYRADII).
```

Normaliziation of the quantity of data points is done by interpolation */

```
    Rsm = Amax (R,ncodes);
/*  NormalizeRadialPeriodandAmp (R, Rnorm, ncodes); */
    NormalizeRadialAmplitude (R, Rnorm, ncodes);

Rmax = Amax(Rnorm, NORMQTYRADII);
    Rmin = Amin(Rnorm, ncodes);
    Rmean = Amean (Rnorm, ncodes);
/*  fprintf (fprad, "Mean Radius = %8.6f\n",Rmean); */
    /* New technique to determine Ri in counting
intercepts base upon
    the minimum peak and maximum valley methodology with
special case
    rules to handle unique situations. Written 6/6/89.
Note that this
    procedure assumes that the data has been normalized
in amplitude
    by the largest radius. */

SortPeaksandValleys (Rnorm, ncodes, &Ri, Rmax,
Rmin);

/* After finding Rmean and Ri (by sorting peaks and
valleys of the
    radial profile), a weighted average is taken of
these 2 values
    by (3*Ri + Rmean)/4. */

Rsolo = (3.*Ri+Rmean)/4.;

cnt1 = 0;
    for (j = 0; j < ncodes-1; j++)
    {
```

```
          if ( cnt1 < MAXINT && (Rnorm[j] < Rsolo &&
Rnorm[j+1] >= Rsolo) ||
          (Rnorm[j+1] <= Rsolo && Rnorm[j] > Rsolo) ) /*
A radial intercept is found */
          {
           Rad_int1[cnt1++] = GetRadialRegion
(xcen,ycen,xcoords[j],ycoords[j]);
          }
        }
```

```
/*   Once the radial intercepts for the arc Rsolo have
been identified and
     their respective locations, the results must be
encoded into the radial
     feature vector which is returned from this
procedure. It is assumed that
     the maximum quantity of intercepts per region is 2.
8 regions are used
     to describe location, thus 16 bits are used in the
feature vector.   */
```

```
/*   Initialize the feature vector to zero */ for (i = 0; i < 16; i++) Radfeatures[i] = 0.;

for (i = 0; i < cnt1; i++)
     {
        pos = Rad_int1[i];
        if (Radfeatures[2*pos] == 1.0)
Radfeatures[2*pos+1] = 1.0;
           else
              Radfeatures[2*pos] = 1.0;
     }
```

```
    *nfeat = 16;

/*  for (i = 0; i < ncodes; i++)
    {
        dist = R[i]/Rmax;
        Q = (int) (dist * NUMBINS); */
/*      if (Q == numbins) Q -= 1; */
/*      Hist[Q] += 1;
    }
*/
}
/******************************************************
******/
#include math
int   GetRadialRegion (xcen,ycen,xcoord,ycoord)
double    xcen,ycen;
int   xcoord, ycoord;
{
static  double theta, anglex, deltax, deltay;
static  int    primaryregion, secondaryregion, region;
static  lut[8][2] = { {0,1}, {1,2},
{2,3},{3,4},{4,5},{5,6},{6,7},{7,0} };
double    fabs();
static    int i,j;

/* Locations of Radial intercepts are encoded with overlapping
        regions: location 0 => 0-1, 1 => 1-2, 2 => 2-3, 3 => 3-4
                 4 => 4-5, 5 => 5-6, 6 => 6-7, 7 => 7-0 */

/* NOTE THAT Y => LINES, X => PIXELS */
```

```
    deltay = (double)ycoord - ycen;
    deltax = (double)xcoord - xcen;

if (fabs(deltax) < .0000001 && deltax >= 0.) theta =
PI/2.;
    else if (fabs(deltax) < .0000001 && deltax < 0.)
theta = PI/-2.0;
    else theta = atan ((deltay/deltax));

if (deltax > 0. && deltay > 0.)
    {
        if ( fabs(theta) <= (PI/4.))

/*      if ( fabs(theta) <= (PI/3.))*/
        {
         primaryregion = 7;
/*       primaryregion = 5;*/
         anglex = 360. - theta * 180. / PI;
        }
        else
        {
/*       primaryregion = 4; */
         primaryregion = 6;
         anglex = 360 - theta * 180. / PI;
        }
        secondaryregion = GetSecondaryRadialRegion
(primaryregion, anglex);
    }
    else if (deltax < 0. && deltay > 0.)
    {
        if (fabs(theta) <= (PI/4.) )
/*      if (fabs(theta) <= (PI/3.) ) */
        {
         primaryregion = 4;
```

```
/*          primaryregion = 3;*/
            anglex = 180. - theta * 180. / PI;
        }
        else
        {
/*          primaryregion = 4;*/
            primaryregion = 5;
            anglex = 180. - theta * 180./PI;
        }
        secondaryregion = GetSecondaryRadialRegion
(primaryregion, anglex);
    }
    else if (deltax < 0. && deltay < 0.)
    {
        if (fabs(theta) <= (PI/4.))
/*      if (fabs(theta) <= (PI/3.)) */
        {
/*          primaryregion = 2; */
            primaryregion = 3;
            anglex = 180. - theta * 180./PI;
        }
        else
        {
/*          primaryregion = 1;*/
            primaryregion = 2;
            anglex = 180. - theta * 180./PI;
        }
        secondaryregion = GetSecondaryRadialRegion
(primaryregion, anglex);
    }
    else if (deltax > 0. && deltay < 0.)
    {
        if (fabs(theta) <= (PI/4.))
/*      if (fabs(theta) <= (PI/3.)) */
```

```
            {
             primaryregion = 0;
             anglex = -1.* theta * 180./PI;
            }
            else
            {
             primaryregion = 1;
             anglex = -1.* theta * 180./PI;
            }
            secondaryregion = GetSecondaryRadialRegion
(primaryregion, anglex);
        }
        region = 0;
        for (i = 0; i < 8; i++)
        {
            if ( (primaryregion == lut[i][0] &&
secondaryregion == lut[i][1]) ||
                (primaryregion == lut[i][1] && secondaryregion
== lut[i][0]) )
                    region = i;
        }
        return (region);
/*      return (primaryregion); */
}
/*******************************************************
******/
GetSecondaryRadialRegion (primaryregion, ax)
int   primaryregion;
double    ax;
{
int   i,j;
int   x1, x2, secondarysection;
double    a1, a2;
double    fabs();
```

```
    if (primaryregion == 0) x2 = 7;
    else x2 = primaryregion - 1;

if (primaryregion == 7) x1 = 0;
    else x1 = primaryregion + 1;

a1 = primaryregion * 45.;
    a2 = (primaryregion +1) * 45.;

if ( fabs((ax-a1)) >= 45./2.) secondarysection = x1;
    else
         secondarysection = x2;

return (secondarysection);
}

/****************************************************
******/
float Amax (Array, n)
float    *Array;
int  n;
{
float temp;
int   i;

temp=0.;
    for (i = 0; i < n; i++)
    {
         if (Array[i] > temp) temp = Array[i];
    }
    return (temp);
}
```

```
/************************************************
******/
float    Amin(Array, n)
float    *Array;
int  n;
{
float temp;
int  i;

temp = 10000000.0;

for (i = 0; i < n; i++)
    {
        if (Array[i] < temp) temp = Array[i];
    }
    return (temp);
}

/************************************************
******/
float    Amean(Array, n)
float    *Array;
int  n;
{
float    sum, returnval;
int  i;

sum = 0.0;
    returnval=0.0;
    for (i =0;i < n; i++)
        sum += Array[i];

returnval = sum / (double) n;
    return (returnval);
}
```

```
/*************************************************
******/
#define   DESIREDSIZE   100
NormalizeRadialPeriodandAmp (R, Rnorm, ncodes)
float    R[MAXRADII], Rnorm[NORMQTYRADII];
int   ncodes;
{
static   float   Rmax, Rmin;
static   float   Scalefactor, xi;
float       Amax(), Amin();     /* functions which return
the largest or smallest value of an array */
static   int    xo,x1;
static   int    i,j;

/* This procedure will normalize data to a
predetermined size
        (defined by DESIREDSIZE) using Linear
Interpolation. Then
        The amplitude data is normalized by the largest
amplitude
        value giving data ranging from 0 to 1.   */

Scalefactor = ((float) ncodes) / ((float)
DESIREDSIZE);
     Rnorm[0] = R[0];
     for (i = 1; i < DESIREDSIZE; i++)
     {
        xi = i * Scalefactor;
        xo = (int) xi;
        x1 = xo+1;
        /* Linear Interpolation equation */
            Rnorm[i]= R[xo] +
     ((R[x1]-R[xo])*(xi-xo)/(float)(x1-xo) );
        }
```

```
    Rmax = Amax (Rnorm, DESIREDSIZE);
    Rmin = Amin (Rnorm, DESIREDSIZE);
    for (i = 0; i < DESIREDSIZE; i++)
    {
        Rnorm[i] = Rnorm[i] / Rmax;
    }
}

/*********************************************************
******/
NormalizeRadialAmplitude (R, Rnorm, ncodes)
float    R[MAXRADII], Rnorm[NORMQTYRADII];
int   ncodes;
{
static   float   Rmax, Rmin;
float    Amax();   /* functions which return the largest value of an array */
static   int    i,j;

Rmax = Amax (R, ncodes);
    for (i = 0; i < ncodes; i++)
    {
        Rnorm[i] = R[i] / Rmax;
    }
/*   C Version */  Smooth (Rnorm, MAXRADII, ncodes);
/*.  Fortran Version    Smooth (&Rnorm, &MAXRADII, &ncodes); */
}

/*********************************************************
**********/
Calc_Centroid (LineBufPtr,
        StartLine,
        StartCol,
        EndLine,
```

```
        EndCol,
        xbar,
        ybar)
/* BOOLEAN     LineBufPtr[300][4000]; */
BOOLEAN
LineBufPtr[NORM_HORIZONTAL_RESOLUTION+4][NORM_VERTICAL_RE
SOLUTION+4];
int  StartLine, EndLine, StartCol, EndCol;
float     *xbar,*ybar;
{
static float   Raw_mom[2][2];
static  float  sum1, sum2;
static  int    I,J,M,N, p, q;

I = 0;
    for (p = 0; p < 2; p++)
    {
     for (q = 0; q < 2; q++)
      {
        sum2 = 0.;
        N = StartLine;
        while (N < EndLine)
        {
         sum1 = 0.;
         M = StartCol;
         while (M < EndCol)
         {
            sum1 = sum1 + LineBufPtr[N][M++] *
power(N,p) * power(M,q);
         }
         sum2 += sum1;
         N++;
        }
```

```
            Raw_mom[p][q] = sum2 / 255.0; /* work w/ 0/255
binary data rather than
                                    0/1 data    */
    }
  }

/*   Coordinates of the centroid   */ if (Raw_mom[0][0] != 0.0)
    {
      *ybar = Raw_mom[1][0] / Raw_mom[0][0];
        *xbar = Raw_mom[0][1] / Raw_mom[0][0];
    }
/*******************************************************
******************/
power(x,n)
int x,n;
{
    int i,p;

p = 1;
    if (n == 0) return(p);
    for (i = 1; i <= n; ++i)
         p = p * x;
    return (p);
}
```

What is claimed is:

1. A feature-based optical character recognition system for extracting features from an individual character image segmented from a document image, comprising:
   radial intercept feature extraction means for counting a number of intercepts between at least one of a plurality of circles of predetermined radii and boundary transitions in said character image;
   transition point location feature extraction means for determining for each transition point in said image an identity of a pair of regions in a grid superimposed on said character image nearest the transition point, whereby said number of intercepts and said identity of said pair of regions comprise an input data string; and
   feature-based recognition means for comparing said input data string with a set of reference data strings corresponding to a set of known symbols.

2. The system of claim 1 wherein said radial intercept feature extraction means comprise:
   means for locating a centroid and boundary of an object in said character image;
   means for selecting one radius of said circle and centering said circle at said centroid.

3. The system of claim 2 wherein said means for selecting said radius comprise:
   means for locating with respect to said centroid a reference radius between a minimum radial peak and a maximum radial valley in said boundary; and
   means for computing said one radius as a weighted average of said reference radius and a mean radius of said boundary.

4. The system of claim 2 wherein said radial intercept feature extraction means further comprises:
means for determining for each one of said intercepts an identity of a pair of polar sections nearest said intercept in a grid of polar sections superimposed on said character image and centered at said centroid, wherein said input data string further comprises said identity of said pair of polar sections.

5. The system of claim 1 wherein said radial intercept means comprises means for generating a histogram of the intercept count at each one of said plurality of radii, wherein said input data string comprises said histogram.

6. The system of claim 1 wherein said transition points comprise end points and branch points in said image.

7. The system of claim 1 further comprising curve feature extraction means for making an identification of which predetermined regions of said character image match one of a set of arc templates, wherein said input data string further comprises said identification of said predetermined regions.

8. The system of claim 7 wherein said curve feature extraction means comprises means for making said identification for each one of a set of four quarter-arc templates.

9. The system of claim 8 wherein said predetermined regions comprise quadrants of said character image.

10. The system of claim 1 further comprising line feature extraction means for making an identification of at least one of a plurality of selected lines having predetermined orientations correlated with said character image, wherein said input data string further comprises said identification of said selected line.

11. The system of claim 10 wherein said plurality of selected lines comprise vertical, horizontal, minor diagonal and major diagonal lines, whereby said line feature extraction means comprises means for making said identification for each one of said selected lines.

12. The system of claim 10 wherein said line feature extraction means comprises means for determining whether the number of "ON" pixels in each one of a plurality of parallel linear regions of said character image characterized by one of said predetermined orientations exceeds a predetermined threshold number.

13. A feature-based optical character recognition method for extracting features from an individual character image segmented from a document image, comprising:
counting a number of intercepts between at least one of a plurality of circles of predetermined radii in said character image and boundary transitions in said character image;
determining for each transition point in said image an identity of a pair of regions in a grid superimposed on said character image nearest the transition point, whereby said number of intercepts and said identity of said pair of regions comprise an input data string; and
comparing said input data string with a set of reference data strings corresponding to a set of known symbols.

14. The method of claim 13 wherein said counting step comprises:
locating a centroid and boundary of an object in said character image;
centering said one circle at said centroid; and
selecting the radius of said one circle.

15. The method of claim 14 wherein said selecting step comprises:
locating with respect to said centroid a reference radius between a minimum radial peak and a maximum radial valley in said boundary; and
computing said radius as a weighted average of said reference radius an a mean radius of said boundary.

16. The method of claim 14 wherein said counting step further comprises:
determining for each one of said intercepts an identity of a pair of polar sections nearest said intercept in a grid of polar sections superimposed on said character image and centered at said centroid, wherein said input data string further comprises said identity of said pair of polar sections.

17. The method of claim 13 wherein said counting step comprises generating a histogram of the intercept count at each one of said plurality of radii, wherein said input data string comprises said histogram.

18. The method of claim 13 wherein said transition points comprise end points and branch points in said image.

19. The method of claim 13 further comprising making an identification of which predetermined regions of said character image match one of a set of arc templates, wherein said input data string further comprises said identification of said predetermined regions.

20. The method of claim 19 wherein said step of making said identification of said predetermined regions comprises making said identification for each one of a set of four quarter-arc templates.

21. The method of claim 20 wherein said predetermined regions comprise quadrants of said character image.

22. The method of claim 13 further comprising making an identification of at least one of a plurality of selected lines having predetermined orientations correlated with said character image, wherein said input data string further comprises said identification of said selected line.

23. The method of claim 22 wherein said plurality of selected lines comprise vertical, horizontal, minor diagonal and major diagonal lines.

24. The method of claim 22 wherein said step of making said identification of said selected line comprises determining whether the number of "ON" pixels in each one of a plurality of parallel linear regions of said character image characterized by one of said predetermined orientations exceeds a predetermined threshold number.

* * * * *